United States Patent
Lin et al.

(10) Patent No.: US 10,441,922 B2
(45) Date of Patent: Oct. 15, 2019

(54) DUAL FUNCTION COMPOSITE OXYGEN TRANSPORT MEMBRANE

(71) Applicants: Jiefeng Lin, Rochester, NY (US);
Pawel Plonczak, Buffalo, NY (US);
Sean M. Kelly, Pittsford, NY (US);
Uttam R. Doraswami, Bangalore (IN);
Jonathan A. Lane, Snyder, NY (US)

(72) Inventors: Jiefeng Lin, Rochester, NY (US);
Pawel Plonczak, Buffalo, NY (US);
Sean M. Kelly, Pittsford, NY (US);
Uttam R. Doraswami, Bangalore (IN);
Jonathan A. Lane, Snyder, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 759 days.

(21) Appl. No.: 14/753,815

(22) Filed: Jun. 29, 2015

(65) Prior Publication Data
US 2016/0375411 A1  Dec. 29, 2016

(51) Int. Cl.
*B32B 3/26* (2006.01)
*B01D 71/02* (2006.01)
(Continued)

(52) U.S. Cl.
CPC ....... *B01D 71/022* (2013.01); *B01D 67/0039* (2013.01); *B01D 67/0048* (2013.01);
(Continued)

(58) Field of Classification Search
None
See application file for complete search history.

(56) References Cited

U.S. PATENT DOCUMENTS

| 2,593,507 | A | 4/1952 | Wainer |
| 2,692,760 | A | 10/1954 | Flurschutz |

(Continued)

FOREIGN PATENT DOCUMENTS

| DE | 10330859 A1 | 2/2004 |
| DE | 102004038435 A1 | 2/2006 |

(Continued)

OTHER PUBLICATIONS

Marra et al., Development of a RhZrO2 catalyst for low temperature autothermal reforming of methane in membrane reactors, Nov. 26, 2013, Catalysis Today, pp. 23-33 (Year: 2013).*

(Continued)

*Primary Examiner* — David Sample
*Assistant Examiner* — Mary I Omori
(74) *Attorney, Agent, or Firm* — Ralph J. Mancini

(57) ABSTRACT

A dual function composite oxygen transport membrane having a layered structure of mixed conducting oxygen transport materials on a first side of a porous substrate and a reforming catalyst layer on an opposing second side of the porous substrate. The layered structure of the mixed conducting oxygen transport materials contains an intermediate porous layer of mixed conducting oxygen transport materials formed on the porous substrate with a dense impervious layer of mixed conducting oxygen transport materials over the intermediate porous layer, and an optional surface exchange layer of mixed conducting oxygen transport materials over the dense impervious layer. The layered structure and the reforming catalyst layer are formed in separate steps.

15 Claims, 8 Drawing Sheets

(51) Int. Cl.
  *B01D 67/00* (2006.01)
  *B01D 69/12* (2006.01)
  *B01J 23/46* (2006.01)
  *B01J 23/89* (2006.01)
  *B01J 35/06* (2006.01)
  *B01D 69/04* (2006.01)
  *B01D 69/10* (2006.01)
  *B01D 53/22* (2006.01)

(52) U.S. Cl.
  CPC ............ *B01D 69/04* (2013.01); *B01D 69/10* (2013.01); *B01D 69/12* (2013.01); *B01D 71/024* (2013.01); *B01J 23/462* (2013.01); *B01J 23/892* (2013.01); *B01J 35/065* (2013.01); *B01D 53/228* (2013.01); *B01D 2311/2696* (2013.01); *B01D 2325/10* (2013.01); *B01D 2325/20* (2013.01)

(56) References Cited

U.S. PATENT DOCUMENTS

| | | |
|---|---|---|
| 3,282,803 A | 11/1966 | Poepel et al. |
| 3,317,298 A | 5/1967 | Klomp et al. |
| 3,468,647 A | 9/1969 | Buyers et al. |
| 3,770,621 A | 11/1973 | Collins et al. |
| 3,861,723 A | 1/1975 | Kunz et al. |
| 3,868,817 A | 3/1975 | Marion et al. |
| 3,930,814 A | 1/1976 | Gessner |
| 3,976,451 A | 8/1976 | Blackmer et al. |
| 4,013,592 A | 3/1977 | Matsuoka et al. |
| 4,128,776 A | 12/1978 | Bonaquist et al. |
| 4,153,426 A | 5/1979 | Wintrell |
| 4,162,993 A | 7/1979 | Retalick |
| 4,175,153 A | 11/1979 | Dobo et al. |
| 4,183,539 A | 1/1980 | French et al. |
| 4,206,803 A | 6/1980 | Finnemore et al. |
| 4,261,167 A | 4/1981 | Paull et al. |
| 4,292,209 A | 9/1981 | Marchant et al. |
| 4,350,617 A | 9/1982 | Retalick et al. |
| 4,357,025 A | 11/1982 | Eckart |
| 4,365,021 A | 12/1982 | Pirooz |
| 4,373,575 A | 2/1983 | Hayes |
| 4,402,871 A | 9/1983 | Retalick |
| 4,609,383 A | 9/1986 | Bonaventura et al. |
| 4,631,238 A | 12/1986 | Ruka |
| 4,650,814 A | 3/1987 | Keller |
| 4,651,809 A | 3/1987 | Gollnick et al. |
| 4,720,969 A | 1/1988 | Jackman |
| 4,734,273 A | 3/1988 | Haskell |
| 4,749,632 A | 6/1988 | Flandermeyer et al. |
| 4,783,085 A | 11/1988 | Wicks et al. |
| 4,791,079 A | 12/1988 | Hazbun |
| 4,862,949 A | 9/1989 | Bell, III |
| 4,866,013 A | 9/1989 | Anseau et al. |
| 5,021,137 A | 6/1991 | Joshi et al. |
| 5,035,726 A | 7/1991 | Chen et al. |
| 5,061,297 A | 10/1991 | Krasberg |
| 5,143,751 A | 9/1992 | Richard et al. |
| 5,169,506 A | 12/1992 | Michaels |
| 5,169,811 A | 12/1992 | Cipollini et al. |
| 5,171,646 A | 12/1992 | Rohr |
| 5,185,301 A | 2/1993 | Li et al. |
| 5,205,990 A | 4/1993 | Lawless |
| 5,240,480 A | 8/1993 | Thorogood et al. |
| 5,259,444 A | 11/1993 | Wilson |
| 5,286,686 A | 2/1994 | Haig et al. |
| 5,298,469 A | 3/1994 | Haig et al. |
| 5,302,258 A | 4/1994 | Renlund et al. |
| 5,306,411 A | 4/1994 | Mazanec et al. |
| 5,342,705 A | 8/1994 | Minh et al. |
| 5,356,730 A | 10/1994 | Minh et al. |
| 5,417,101 A | 5/1995 | Weich |
| 5,432,705 A | 7/1995 | Severt et al. |
| 5,454,923 A | 10/1995 | Nachlas et al. |
| 5,478,444 A | 12/1995 | Liu et al. |
| 5,534,471 A | 7/1996 | Carolan et al. |
| 5,547,494 A | 8/1996 | Prasad et al. |
| 5,569,633 A | 10/1996 | Carolan et al. |
| 5,599,509 A | 2/1997 | Toyao et al. |
| 5,643,355 A | 7/1997 | Phillips et al. |
| 5,649,517 A | 7/1997 | Poola et al. |
| 5,707,911 A | 1/1998 | Rakhimov et al. |
| 5,750,279 A | 5/1998 | Carolan et al. |
| 5,804,155 A | 9/1998 | Farrauto et al. |
| 5,820,654 A | 10/1998 | Gottzman et al. |
| 5,820,655 A | 10/1998 | Gottzmann et al. |
| 5,837,125 A | 11/1998 | Prasad et al. |
| 5,855,762 A | 1/1999 | Phillips et al. |
| 5,864,576 A | 1/1999 | Nakatani et al. |
| 5,902,379 A | 5/1999 | Phillips et al. |
| 5,927,103 A | 7/1999 | Howard |
| 5,932,141 A | 8/1999 | Rostrop-Nielsen et al. |
| 5,944,874 A | 8/1999 | Prasad et al. |
| 5,964,922 A | 10/1999 | Keskar et al. |
| 5,975,130 A | 11/1999 | Ligh et al. |
| 5,980,840 A | 11/1999 | Kleefisch et al. |
| 6,010,614 A | 1/2000 | Keskar et al. |
| 6,035,662 A | 3/2000 | Howard et al. |
| 6,048,472 A | 4/2000 | Nataraj et al. |
| 6,051,125 A | 4/2000 | Pham et al. |
| 6,070,471 A | 6/2000 | Westphal et al. |
| 6,077,323 A | 6/2000 | Nataraj et al. |
| 6,110,979 A | 8/2000 | Nataraj et al. |
| 6,113,673 A | 9/2000 | Loutfy et al. |
| 6,114,400 A | 9/2000 | Nataraj et al. |
| 6,139,810 A | 10/2000 | Gottzmann et al. |
| 6,153,163 A | 11/2000 | Prasad et al. |
| 6,191,573 B1 | 2/2001 | Noda |
| RE37,134 E | 4/2001 | Wilson |
| 6,214,066 B1 | 4/2001 | Nataraj et al. |
| 6,214,314 B1 | 4/2001 | Nataraj et al. |
| 6,268,075 B1 | 7/2001 | Autenrieth et al. |
| 6,290,757 B1 | 9/2001 | Lawless |
| 6,293,084 B1 | 9/2001 | Drnevich et al. |
| 6,293,978 B2 | 9/2001 | Kleefisch et al. |
| 6,296,686 B1 | 10/2001 | Prasad et al. |
| 6,333,015 B1 | 12/2001 | Lewis |
| 6,352,624 B1 | 3/2002 | Crome et al. |
| 6,355,093 B1 | 3/2002 | Schwartz et al. |
| 6,360,524 B1 | 3/2002 | Drnevich et al. |
| 6,368,383 B1 * | 4/2002 | Virkar ................ B01D 53/228 95/54 |
| 6,368,491 B1 | 4/2002 | Cao et al. |
| 6,382,958 B1 | 5/2002 | Bool, III et al. |
| 6,394,043 B1 | 5/2002 | Bool, III et al. |
| 6,402,156 B1 | 6/2002 | Schutz et al. |
| 6,402,988 B1 | 6/2002 | Gottzmann et al. |
| 6,430,966 B1 | 8/2002 | Meinhardt et al. |
| 6,468,328 B2 | 10/2002 | Sircar et al. |
| 6,475,657 B1 | 11/2002 | Del-Gallo et al. |
| 6,492,290 B1 | 12/2002 | Dyer et al. |
| 6,532,769 B1 | 3/2003 | Meinhardt et al. |
| 6,537,514 B1 | 3/2003 | Prasad et al. |
| 6,562,104 B2 | 5/2003 | Bool, III et al. |
| 6,592,731 B1 | 7/2003 | Lawless |
| 6,638,575 B1 | 10/2003 | Chen et al. |
| 6,641,626 B2 | 11/2003 | Van Calcar et al. |
| 6,652,626 B1 | 11/2003 | Plee |
| 6,681,589 B2 | 1/2004 | Brudnicki |
| 6,695,983 B2 | 2/2004 | Prasad et al. |
| 6,783,750 B2 | 8/2004 | Shah et al. |
| 6,786,952 B1 | 9/2004 | Risdal et al. |
| 6,811,904 B2 | 11/2004 | Gorte et al. |
| 6,846,511 B2 | 1/2005 | Visco et al. |
| 6,916,570 B2 | 7/2005 | Vaughey et al. |
| 7,077,133 B2 | 7/2006 | Yagi et al. |
| 7,125,528 B2 | 10/2006 | Besecker et al. |
| 7,153,559 B2 | 12/2006 | Ito et al. |
| 7,179,323 B2 | 2/2007 | Stein et al. |
| 7,229,537 B2 | 6/2007 | Chen et al. |
| 7,261,751 B2 | 8/2007 | Dutta et al. |
| 7,320,778 B2 | 1/2008 | Whittenberger |
| 7,351,488 B2 | 4/2008 | Visco et al. |

(56) References Cited

U.S. PATENT DOCUMENTS

| | | | |
|---|---|---|---|
| 7,374,601 B2 | 5/2008 | Bonchonsky et al. | |
| 7,396,442 B2 | 7/2008 | Bagby et al. | |
| 7,427,368 B2 | 9/2008 | Drnevich | |
| 7,470,811 B2 | 12/2008 | Thiebaut | |
| 7,510,594 B2 | 3/2009 | Wynn et al. | |
| 7,534,519 B2 | 5/2009 | Cable et al. | |
| 7,556,676 B2 | 7/2009 | Nagabhushana et al. | |
| 7,588,626 B2 | 9/2009 | Gopalan et al. | |
| 7,658,788 B2 | 2/2010 | Holmes et al. | |
| 7,786,180 B2 | 8/2010 | Fitzpatrick | |
| 7,833,314 B2 | 11/2010 | Lane et al. | |
| 7,846,236 B2 | 12/2010 | Del-Gallo et al. | |
| 7,856,829 B2 | 12/2010 | Shah et al. | |
| 7,871,579 B2 | 1/2011 | Tentarelli | |
| 7,901,837 B2 | 3/2011 | Jacobson et al. | |
| 7,906,079 B2 | 3/2011 | Whittenberger et al. | |
| 7,968,208 B2 | 6/2011 | Hodgson | |
| 8,070,922 B2 | 12/2011 | Nelson et al. | |
| 8,128,988 B2 | 3/2012 | Yasumoto et al. | |
| 8,196,387 B2 | 6/2012 | Shah et al. | |
| 8,201,852 B2 | 6/2012 | Linhorst et al. | |
| 8,262,755 B2 | 9/2012 | Repasky et al. | |
| 8,323,378 B2 | 12/2012 | Swami et al. | |
| 8,323,463 B2 | 12/2012 | Christie et al. | |
| 8,349,214 B1 | 1/2013 | Kelly et al. | |
| 8,419,827 B2 | 4/2013 | Kelly et al. | |
| 8,435,332 B2 | 5/2013 | Christie et al. | |
| 8,455,382 B2 | 6/2013 | Carolan et al. | |
| 8,658,328 B2 | 2/2014 | Suda et al. | |
| 8,795,417 B2 | 8/2014 | Christie et al. | |
| 8,894,944 B2 | 11/2014 | Larsen et al. | |
| 9,023,245 B2 | 5/2015 | Chakravarti et al. | |
| 9,115,045 B2 | 8/2015 | Chakravarti et al. | |
| 9,212,113 B2 | 12/2015 | Chakravarti et al. | |
| 9,296,671 B2 | 3/2016 | Stuckert et al. | |
| 9,365,466 B2 | 6/2016 | Chakravarti et al. | |
| 9,452,401 B2 | 9/2016 | Kelly et al. | |
| 9,453,644 B2 | 9/2016 | Kromer et al. | |
| 9,561,476 B2 * | 2/2017 | Lane | B01D 53/228 |
| 2002/0073938 A1 | 6/2002 | Bool et al. | |
| 2002/0078906 A1 | 6/2002 | Prasad et al. | |
| 2002/0141920 A1 | 10/2002 | Alvin et al. | |
| 2002/0155061 A1 | 10/2002 | Prasad et al. | |
| 2003/0039601 A1 | 2/2003 | Halvorson et al. | |
| 2003/0039608 A1 | 2/2003 | Shah et al. | |
| 2003/0054154 A1 | 3/2003 | Chen et al. | |
| 2003/0068260 A1 | 4/2003 | Wellington | |
| 2003/0230196 A1 | 12/2003 | Kim | |
| 2004/0042944 A1 | 3/2004 | Sehlin | |
| 2004/0043272 A1 | 3/2004 | Gorte | |
| 2004/0065541 A1 | 4/2004 | Sehlin et al. | |
| 2004/0089973 A1 | 5/2004 | Hoang | |
| 2004/0135324 A1 | 7/2004 | Brule et al. | |
| 2004/0221722 A1 | 11/2004 | Prasad et al. | |
| 2005/0037299 A1 | 2/2005 | Gottzmann | |
| 2005/0058871 A1 | 3/2005 | Li et al. | |
| 2005/0061663 A1 | 3/2005 | Chen et al. | |
| 2005/0137810 A1 | 6/2005 | Esposito, Jr. | |
| 2005/0214612 A1 | 9/2005 | Visco et al. | |
| 2005/0248098 A1 | 11/2005 | Sisk et al. | |
| 2005/0263405 A1 | 12/2005 | Jacobson et al. | |
| 2006/0019827 A1 | 1/2006 | Whittenberger | |
| 2006/0029539 A1 | 2/2006 | Dutta et al. | |
| 2006/0054301 A1 | 3/2006 | McRay et al. | |
| 2006/0062707 A1 | 3/2006 | Crome et al. | |
| 2006/0063659 A1 | 3/2006 | Xue et al. | |
| 2006/0127656 A1 | 6/2006 | Gallo et al. | |
| 2006/0127749 A1 | 6/2006 | Christie et al. | |
| 2006/0191408 A1 | 8/2006 | Gopalan et al. | |
| 2006/0236719 A1 | 10/2006 | Lane et al. | |
| 2007/0004809 A1 | 1/2007 | Lattner et al. | |
| 2007/0029342 A1 | 2/2007 | Cross et al. | |
| 2007/0039466 A1 | 2/2007 | Nawata et al. | |
| 2007/0041894 A1 | 2/2007 | Drnevich | |
| 2007/0065687 A1 | 3/2007 | Kelly et al. | |
| 2007/0082254 A1 | 4/2007 | Hiwatashi | |
| 2007/0104793 A1 | 5/2007 | Akash | |
| 2007/0122667 A1 | 5/2007 | Kelley | |
| 2007/0137478 A1 | 6/2007 | Stein et al. | |
| 2007/0158329 A1 | 7/2007 | Cao | |
| 2007/0163889 A1 | 7/2007 | Kato et al. | |
| 2007/0212271 A1 | 9/2007 | Kennedy | |
| 2007/0245897 A1 | 10/2007 | Besecker et al. | |
| 2007/0289215 A1 | 12/2007 | Hemmings et al. | |
| 2007/0292342 A1 | 12/2007 | Hemmings et al. | |
| 2007/0292742 A1 | 12/2007 | Ball et al. | |
| 2008/0000350 A1 | 1/2008 | Mundschau et al. | |
| 2008/0000353 A1 | 1/2008 | Rarig et al. | |
| 2008/0006532 A1 | 1/2008 | Mukundan et al. | |
| 2008/0023338 A1 | 1/2008 | Stoots et al. | |
| 2008/0029388 A1 | 2/2008 | Elangovan et al. | |
| 2008/0047431 A1 | 2/2008 | Nagabhushana | |
| 2008/0141672 A1 | 6/2008 | Shah et al. | |
| 2008/0142148 A1 | 6/2008 | Nielsen et al. | |
| 2008/0168901 A1 | 7/2008 | Carolan et al. | |
| 2008/0169449 A1 | 7/2008 | Mundschau | |
| 2008/0226544 A1 | 9/2008 | Nakamura | |
| 2008/0302013 A1 | 12/2008 | Repasky et al. | |
| 2009/0001727 A1 | 1/2009 | De Koeijer et al. | |
| 2009/0018373 A1 | 1/2009 | Werth et al. | |
| 2009/0023050 A1 | 1/2009 | Finnerty et al. | |
| 2009/0029040 A1 | 1/2009 | Christie et al. | |
| 2009/0031895 A1 | 2/2009 | Del-Gallo et al. | |
| 2009/0084035 A1 | 4/2009 | Wei | |
| 2009/0107046 A1 | 4/2009 | Leininger | |
| 2009/0120379 A1 | 5/2009 | Bozzuto et al. | |
| 2009/0220837 A1 | 9/2009 | Osada | |
| 2009/0272266 A1 | 11/2009 | Werth et al. | |
| 2010/0015014 A1 | 1/2010 | Gopalan et al. | |
| 2010/0018394 A1 | 1/2010 | Ekiner et al. | |
| 2010/0074828 A1 | 3/2010 | Singh | |
| 2010/0076280 A1 | 3/2010 | Bernstein et al. | |
| 2010/0116133 A1 | 5/2010 | Reed et al. | |
| 2010/0116680 A1 | 5/2010 | Reed et al. | |
| 2010/0122552 A1 | 5/2010 | Schwartz | |
| 2010/0143824 A1 | 6/2010 | Tucker et al. | |
| 2010/0178219 A1 | 7/2010 | Verykios et al. | |
| 2010/0178238 A1 | 7/2010 | Takamura et al. | |
| 2010/0193104 A1 | 8/2010 | Ryu et al. | |
| 2010/0200418 A1 | 8/2010 | Licht | |
| 2010/0203238 A1 | 8/2010 | Magno et al. | |
| 2010/0266466 A1 | 10/2010 | Froehlich et al. | |
| 2010/0276119 A1 | 11/2010 | Doty | |
| 2010/0313762 A1 | 12/2010 | Roeck et al. | |
| 2011/0020192 A1 | 1/2011 | Baumann et al. | |
| 2011/0067405 A1 | 3/2011 | Armstrong et al. | |
| 2011/0076213 A1 | 3/2011 | Carolan et al. | |
| 2011/0111320 A1 | 5/2011 | Suda et al. | |
| 2011/0120127 A1 | 5/2011 | Lippmann et al. | |
| 2011/0132367 A1 | 6/2011 | Patel | |
| 2011/0142722 A1 | 6/2011 | Hemmings et al. | |
| 2011/0143255 A1 | 6/2011 | Jain et al. | |
| 2011/0180399 A1 | 7/2011 | Christie et al. | |
| 2011/0200520 A1 | 8/2011 | Ramkumar | |
| 2011/0240924 A1 | 10/2011 | Repasky | |
| 2011/0253551 A1 | 10/2011 | Lane et al. | |
| 2012/0000360 A1 | 1/2012 | Richet et al. | |
| 2012/0067060 A1 | 3/2012 | Greeff | |
| 2012/0067210 A1 | 3/2012 | Sane et al. | |
| 2012/0288439 A1 | 11/2012 | Sundaram et al. | |
| 2012/0294783 A1 | 11/2012 | Palamara et al. | |
| 2013/0009100 A1 | 1/2013 | Kelly et al. | |
| 2013/0009102 A1 | 1/2013 | Kelly et al. | |
| 2013/0015405 A1 | 1/2013 | Quintero | |
| 2013/0072374 A1 | 3/2013 | Lane et al. | |
| 2013/0072375 A1 | 3/2013 | Lane et al. | |
| 2013/0156958 A1 | 6/2013 | Belov et al. | |
| 2013/0258000 A1 | 10/2013 | Ohashi et al. | |
| 2014/0044604 A1 | 2/2014 | Lane et al. | |
| 2014/0056774 A1 | 2/2014 | Kelly et al. | |
| 2014/0060643 A1 | 3/2014 | Martin et al. | |
| 2014/0183866 A1 | 7/2014 | Kromer et al. | |
| 2014/0206779 A1 | 7/2014 | Lackner | |
| 2014/0231351 A1 | 8/2014 | Wickramasinghe et al. | |

(56) References Cited

U.S. PATENT DOCUMENTS

| | | | |
|---|---|---|---|
| 2014/0319424 A1 | 10/2014 | Chakravarti et al. | |
| 2014/0319427 A1 | 10/2014 | Chakravarti et al. | |
| 2014/0323597 A1* | 10/2014 | Stuckert | C07C 29/1518 518/703 |
| 2014/0323598 A1 | 10/2014 | Chakravarti et al. | |
| 2014/0323599 A1 | 10/2014 | Chakravarti et al. | |
| 2015/0096506 A1 | 4/2015 | Kelly et al. | |
| 2015/0098872 A1* | 4/2015 | Kelly | B01J 8/067 422/187 |
| 2015/0226118 A1 | 8/2015 | Kelly et al. | |
| 2016/0001221 A1 | 1/2016 | Lu et al. | |
| 2016/0118188 A1 | 4/2016 | Wada | |
| 2016/0155570 A1 | 6/2016 | Shimada et al. | |

FOREIGN PATENT DOCUMENTS

| | | |
|---|---|---|
| EP | 0 663 231 A2 | 7/1995 |
| EP | 0926096 A1 | 6/1999 |
| EP | 0984500 A2 | 3/2000 |
| EP | 0989093 A2 | 3/2000 |
| EP | 1504811 A1 | 2/2005 |
| EP | 1717420 A1 | 11/2006 |
| EP | 1743694 A1 | 1/2007 |
| EP | 2 098 491 A1 | 9/2009 |
| EP | 2873451 A1 | 5/2015 |
| GB | 688657 | 3/1953 |
| GB | 689522 | 4/1953 |
| GB | 697377 | 9/1953 |
| GB | 713553 | 11/1954 |
| GB | 1199483 | 7/1970 |
| GB | 1 312 700 | 4/1973 |
| GB | 1348375 | 3/1974 |
| JP | 56-136605 | 10/1981 |
| JP | 2001-520931 | 11/2001 |
| JP | 2003-534906 | 11/2003 |
| WO | WO 97/41060 | 11/1997 |
| WO | WO 2011/020192 A1 | 11/1997 |
| WO | WO 9842636 | 10/1998 |
| WO | WO 0017418 | 3/2000 |
| WO | WO 0109059 A1 | 2/2001 |
| WO | WO 2004/063110 A2 | 7/2004 |
| WO | WO 2006/064160 A1 | 6/2006 |
| WO | WO 2007060141 | 5/2007 |
| WO | WO 2007/092844 A2 | 8/2007 |
| WO | WO 2007086949 | 8/2007 |
| WO | WO 2008024405 | 2/2008 |
| WO | WO 2009/027099 A1 | 3/2009 |
| WO | WO 2010052641 A2 | 5/2010 |
| WO | WO 2011083333 A1 | 7/2011 |
| WO | WO 2011121095 A2 | 10/2011 |
| WO | WO 2012118730 | 9/2012 |
| WO | WO 2013009560 A1 | 1/2013 |
| WO | WO 2013062413 A1 | 5/2013 |
| WO | WO 2013089895 A1 | 6/2013 |
| WO | WO 2014/049119 A1 | 4/2014 |
| WO | 2014/072474 A1 | 5/2014 |
| WO | WO 2014074559 A1 | 5/2014 |
| WO | WO 2014077531 A1 | 5/2014 |
| WO | WO 2014107707 A2 | 7/2014 |
| WO | WO 2014/160948 A1 | 10/2014 |
| WO | WO 2014176022 A1 | 10/2014 |

OTHER PUBLICATIONS

Gurav et al., Carbon dioxide reforming of methane over ruthenium substituted strontium titanate perovskite catalysts, Sep. 10, 2012, Indian Journal of Chemistry (Year: 2012).*

M. Solvang, K.A. Nielsen, and P.H. Larsen, "Optimization of Glass Ceramic Sealant for Intermediate Temperature Solid Oxide Fuel Cells", Jan. 1, 2005, XP055352985, Retrieved from the Internet: URL:http://ma.ecsdl.org/content/MA2005-01/30/1206.full.pdf on Mar. 8, 2017.

VDM Crofer et al., "Material Data Sheet No. 4046 May 2010 Edition", Jan. 1, 2010, XP055353076, Retrieved from the Internet: URL:http://www.vdm-metals.com/fileadmin/user_upload/Downloads/Data_Sheets/Data_Sheet_VDM_Crofer_22_APU.pdf retrieved on Mar. 9, 2017.

Switzer et al., "Cost and Feasibility Study on the Praxair Advanced Boiler for the CO2 Capture Project's Refinery Scenario", Carbon Dioxide Capture for Deep Geologic Formations, vol. 1, D.C. Thomas and S.M. Benson (Eds.), Copyright 2005 Published by Elsevier Ltd., Chapter 32, pp. 561-579.

David Studer; Demonstration of a cylinder fill system based on solid electrolyte oxygen separator (SEOS) technology: Early field assessment at a USAF maintenance facility, (Air Products & Chemicals Inc.); AFRL-RH-BR-TR-2010-0046; Jun. 2010.

Zhu et al.; Development of Interconnect Materials for Solid Oxide Fuel Cells; Materials Science and Engineering A348, Apr. 23, 2002, pp. 227-243.

Lee Rosen et al.; "Development of Oxygen Transport Membranes for Coal-Based Power Generation"; ScienceDirect (Available online at www.sciencedirect.com); Energy Procedia 4 (2011) pp. 750-755.

F. Bidrawn et al., "Efficient Reduction of CO2 in a Solid Oxide Electrolyzer" Electrochemical and Solid State Letters, vol. 11, No. 9, Jun. 20, 2008, pp. B167-B170, XP002644615, Column 1, 2.

Ebbesen et al., "Electrolysis of carbon dioxide in Solid Oxide Electrolysis Cells", Journal of Power Sources, Elsevier SA, CH, vol. 193, No. 1, Aug. 1, 2009, pp. 349-358, XP026150424, ISSN: 0378-7753, DOI: 10.1016/J. JPOWSOUR. 2009. 02. 093.

The U.S. Department of Energy, "Evaluation of Fossil Fuel Power Plants with CO2 Recovery", Final Report (Feb. 2002).

U.S. Department of Energy—Office of Fossil Energy and U.S. Department of Energy/NETL, "Evaluation of Innovative Fossil Fuel Power Plants with CO2 Removal", Interim Report (Dec. 2000).

Sylvain Deville; "Freeze-Casting of Porous Ceramics: A Review of Current Achievements and Issues"; Advanced Engineering Materials 2008, 10, No. 3, pp. 155-169.

Neville Holt, "Gasification Process Selection—Trade-offs and Ironies", Presented at the Gasification Technologies Conference 2004, Oct. 3-6, 2004 JW Marriott Hotel, Washington, D.C. pp. 1-10.

Marschner et al., "Gas Production", Ullmann's Encyclopedia of Industrial Chemistry, Jun. 15, 2000, pp. 1-21, XP002253967.

Dyer et al., "Ion Transport Membrane Technology for Oxygen Separation and Syngas Production", Solid State Ionics 134 (2000) p. 21-33.

Andrea Montebelli et al., "Methods for the catalytic activation of metallic structured substrates", Catalysis Science & Technology, 2014, pp. 2846-2870.

Joseph J. Beaman, D.Sc.; "Oxygen Storage on Zeolites"; Prepared by USAF School of Aerospace Medicine, Human Systems Divisions (AFSC), Brooks Air Force Base, TX 78235-5301; USAFSAM-TR-88-26; AD-A209 352; pp. 1-77; Jan. 1989.

Radtke et al., "Renaissance of Gasification based on Cutting Edge Technologies", VGB PowerTech (2005), XP-001235150, pp. 106-115.

L. N. Protasova et al., "Review of Patent Publications from 1990 to 2010 on Catytic Coatings on Different Substrates, Including Microstructured Channels: Preparation, Deposition Techniques, Applications", Recent Patents on Chemical Engineering, 2012, pp. 28-44.

Zhimin Zhong, "Stoichiometric lanthanum chromite based ceramic interconnects with low sintering temperature", Solid State oflonics, North Holland Pub. Company, Amsterdam, NL, vol. 177 No. 7-8, Mar. 15, 2006, pp. 757-764, XP027895768,ISSN: 0167-2738.

Babcock & Wilcox, Steam 40, "Sulfur Dioxide Control" (1992), pp. 35-1-35-15.

M.F. Lu et al., Thermomechanical transport and anodic properties of perovskite-type (LaSr) CrFeO, Journal of Power Sources, Elsevier SA, CH, vol. 206, Jan. 15, 2012, pp. 59-69, XP028403091.

Okawa et al., Trial Design of a CO2 Recovery Power Plant by Burning Pulverized Coal in O2/CO2, Energy Convers. Mgmt., vol. 38, Supplement (1997) pp. S123-S127.

Ciacchi, et al., "Tubular zirconia-yttria electrolyte membrane technology for oxygen separation", Solid State Ionics 152-153, 2002, pp. 763-768.

(56) References Cited

OTHER PUBLICATIONS

Jian-jun Liu, Tong Liu, Wen-dong Wang, Jian-feng Gao, Chu-sheng Chen; $Zr_{0.84}Y_{0.16}O_{1.92}$-$La_{0.8}Sr_{0.2}Cr_{0.5}Fe_{0.5}O_{3-\delta}$ dual-phase composite hollow fiber membrane targeting chemical reactor applications; Journal of Membrane Science 389 (2012) 435-440.

\* cited by examiner

DUAL FUNCTION COMPOSITE OXYGEN TRANSPORT MEMBRANE

U.S. GOVERNMENT RIGHTS

The invention disclosed and claimed herein was made with United States Government support under Cooperative Agreement number DE-FC26-07NT43088 awarded by the U.S. Department of Energy. The United States Government has certain rights in this invention.

FIELD OF THE INVENTION

The present invention relates to a dual function composite oxygen transport membrane and a method of manufacturing the article itself. More specifically, the invention relates to a dual function composite membrane having a ceramic substrate with a mixed conducting dense layer on one side of the substrate for oxygen transport and a catalyst layer on the opposing side of the substrate for catalyzing endothermic reforming reactions. The membrane is produced by depositing the mixed conducting dense layer and the catalyst layer on the opposing sides of the substrate in separate steps. The catalyst layer is formed using catalyst material selected to promote endothermic reactions.

BACKGROUND

Composite oxygen transport membranes have been proposed for a variety of uses that involve the production of essentially pure oxygen by separation of oxygen from an oxygen containing feed through oxygen transport through such membrane. For example, such membranes can be used in combustion devices to support oxy-fuel combustion or in reactors for partial oxidation reactions involving the production of a synthesis gas or generation of heat to support endothermic chemical reactions.

In such applications, the composite oxygen transport membranes contain a dense layer of a mixed conducting material that allows transport of both oxygen ions and electrons at elevated temperatures. The dense layer is formed on a ceramic substrate that functions as a porous support. The dense layer can be composed of a mixed conductor or two phases of materials, an ionic phase to conduct the oxygen ions and an electronic phase to conduct the electrons. Typical mixed conductors are formed from doped perovskite structured materials. In case of a mixture of materials, the ionic conductor can be yttrium or scandium stabilized zirconia, and the electronic conductor can be a perovskite structured material that will transport electrons or can be a metal or metal alloy or a mixture of the perovskite type material and metal or metal alloy. Some known membranes also have additional layers such as a porous surface exchange layer located on the feed side of the dense layer to enhance reduction of the oxygen into oxygen ions, and an intermediate porous layer on the opposing side of the dense layer. Such a composite membrane is illustrated in U.S. Pat. No. 7,556,676 that utilizes two phase materials for the dense layer, the porous surface exchange layer and the intermediate porous layer. These layers are supported on a porous support that can be formed of zirconia.

In order to minimize the resistance of the membrane to the ionic transport, such membranes are made as thin as practical and are supported on a porous support. Since the resistance to oxygen transport is dependent on the thickness of the membrane, the dense layer is made as thin as possible and therefore must be supported. Another limiting factor to the performance of an oxygen transport membrane concerns the supporting layers on either side of the dense layer; these supporting layers may or may not be active for oxygen ion or electron conducting. These layers themselves can consist of a network of interconnected pores that can limit diffusion of the oxygen, or fuel or other substance through the membrane to facilitate oxygen transport and enhance oxygen flux across the membrane. Therefore, such support layers are typically fabricated with a graded porosity in which the pore size decreases in a direction taken towards the dense layer or are made highly porous throughout. The high porosity, however, tends to weaken such a structure. The resulting composite oxygen transport membrane can be fabricated as a planar element or as a tubular element in which the dense layer is situated either on the inside surface or the outside surface of the planar element or tube.

The composite oxygen transport membranes function by transporting oxygen ions through a material that is capable of conducting oxygen ions and electrons at elevated temperatures. An oxygen containing stream flows on one side, retentate side of the membrane, at least a portion of which contacts the membrane surface. Oxygen in the contacting oxygen containing stream ionizes on the membrane surface and the resultant oxygen ions are driven through the mixed conducting material and emerge on the opposite side thereof to recombine into elemental oxygen. In the recombination, electrons are liberated and are transported back through the membrane to the retentate side to begin the ionization cycle. The permeated oxygen reacts with a fuel flowing on the permeate side of the membrane. The combustion reactions produce products such as synthesis gases by means of partial oxidation of the fuel. It is to be noted that the combustion reactions by combusting at least some of the permeated oxygen produce a difference in oxygen partial pressure across the membrane that can serve as a driving potential for oxygen transport across the membrane. The combustion reactions also produce heat that is used to raise the temperature of the membrane to an operational temperature at which the oxygen transport can occur. Heat in excess of that required to maintain the membrane at a desired operational temperature can be utilized to supply heat to an industrial process that requires heating. In syngas production applications the fuel stream introduced on the permeate side typically contains combustible species such as hydrogen, carbon monoxide, methane. In some instances other hydrocarbons may also be present in the fuel stream. Unreacted combustible gas leaves with the effluent on the permeate side.

Use of oxidation catalysts have been proposed to enhance syngas production. The oxidation catalysts can be incorporated within mixed conducting layer through which oxygen transport occurs or the oxidation catalysts can be disposed within the membrane as a contiguous layer to the mixed conducting layer. For example, U.S. Pat. No. 5,569,633 discloses surface catalyzed multi-layer ceramic membranes having a dense mixed conducting multicomponent metallic oxide layer with a first surface contiguous to a porous support surface and a second surface coated with catalyst material to enhance oxygen flux by catalyzing reactions with oxygen separated from an oxygen containing feed gas. Unexpected benefit of higher oxygen flux was observed upon coating the membrane surface in contact with the oxygen containing feed gas with catalytic material. However, such solutions utilizing oxidation catalysts initially accelerate the oxygen flux but the performance deteriorates due to the intense redox cycles experienced by the oxidation catalyst material, resulting in membrane cracks and functional layer delamination. U.S. Pat. No. 8,323,463 discussed impregnating the intermediate porous layer including a layer of porous support contiguous to the intermediate porous layer with catalysts such as gadolinium doped ceria to promote oxidation of a combustible substance, and thus increase oxygen flux. U.S. Pat. No. 4,791,079 advocated the integration of impervious mixed conducting ceramic layer with a porous catalyst for hydrocarbon oxidation or dehydrogenation. Lithium or sodium promoted manganese complexes were suggested as preferred catalysts. U.S. Patent Publication No. 2006/0127656 applied a porous catalytic layer adjacent to the mixed conducting dense layer for catalytic partial oxidation of hydrocarbons.

Use of reforming catalysts has also been proposed to enhance syngas production by converting the unreacted hydrocarbon present on the permeate side. The reforming catalyst can be positioned proximate to the membrane permeate side as distinct catalyst elements separate from the membrane. Examples of such distinct catalyst elements include structured catalyst inserts in the form of pellets, foils, mesh structures, monoliths and the like. However, such solutions add pressure drop and complexity. The need continues to exist to advantageously deploy reforming catalyst to get higher synthesis gas yield, convert more of the methane in feed stream to synthesis gas by reforming reactions, and manage heat released from combustion reactions within the membrane to support endothermic reforming reactions. The reforming catalyst should not adversely affect oxygen flux, neither introduce contaminants into the mixed conducting oxygen transport layers nor cause structural and/or functional degradation.

As will be discussed the present invention provides a dual function composite oxygen transport membrane and a method of manufacturing the article itself. More specifically, the invention relates to a dual function composite membrane that separates oxygen as well as catalyzes reforming reactions, wherein said dual function composite membrane comprises a ceramic substrate with a mixed conducting dense layer on one side of the substrate for oxygen transport, and a catalyst layer on the opposing side of the substrate for catalyzing endothermic reforming reactions. The membrane is produced by depositing the mixed conducting dense layer and the catalyst layer on the opposing sides of the substrate in separate steps. The catalyst layer is formed using catalyst material selected to promote endothermic reforming reactions thereby to convert hydrocarbon in the permeate side reaction mixture into syngas.

SUMMARY OF THE INVENTION

In one aspect, the present invention provides a dual function composite oxygen transport membrane that at an elevated temperature separates oxygen from an oxygen containing gas stream contacting a first side of the membrane and converts a hydrocarbon gas contacting a second side of the membrane into syngas by catalyzing reforming reactions.

In accordance with this aspect of the present invention, the dual function composite oxygen transport membrane comprises a porous substrate having a first side and an opposing second side; a layered structure comprising at least a dense layer to transport oxygen ions and electrons; a layered structure comprising at least a catalyst layer also referred to as a reforming catalyst layer or a catalyst containing layer to catalyze reforming reactions. The dense layer containing layered structure is provided on the first side of the porous substrate forming the first side of the membrane. The catalyst containing layered structure is provided on the opposing second side of the porous substrate forming the second side of the membrane. The porous substrate is an integral part of the membrane, provides mechanical support for the layered structures on the first side and the opposing second side of the substrate, and separates the dense layer and the catalyst containing layer.

In another aspect, the present invention provides a dual function composite oxygen transport membrane comprising a porous substrate having a first side and an opposing second side with a defined thickness between the first side and the opposing second side; a dense layer having electronic and ionic conducting phases for oxygen transport across the dense layer; a catalyst layer to catalyze conversion of a hydrocarbon gas upon contacting the catalyst layer into syngas; wherein the dense layer is located on the first side of the porous substrate and the catalyst layer is located on the opposing second side of the porous substrate, spaced apart from the dense layer, i.e, the dense layer and the catalyst layer are separated at least by the porous substrate.

In yet another aspect the present invention provides a method of forming a dual function composite oxygen transport membrane. The method includes: forming a porous substrate having a first side and an opposing second side with a defined thickness between the first side and the opposing second side; forming a plurality of mixed conducting layers (each having a defined thickness and a defined composition) on the first side of the porous substrate to provide oxygen by oxygen transport for oxy-fuel combustion; forming a catalyst layer on the opposing second side of the porous substrate wherein the catalyst layer catalyzes reforming of a hydrocarbon gas to form syngas upon contacting the catalyst layer.

In one embodiment of the present invention the dual function composite oxygen transport membrane comprises a layered structure of mixed conducting oxygen transport layers formed on a first side of a porous support and a reforming catalyst layer also referred to as a catalyst layer formed on an opposing second side of the porous support. The layered structure of mixed conducting oxygen transport layers contain at least a mixed conducting layer referred to as a dense layer having an electronic phase and an ionic phase, wherein the electronic phase comprising $(La_{1-x}M_x)_w Cr_{1-y-z}Fe_yM'_zO_{3-\delta}$, where M: Ba, Sr, Ca; M': Co, Ni, Ru, x is from about 0.1 to about 0.5, w is from about 0.90 to about 1.0, y is from 0.00 to 1, z is from about 0.00 to about 0.2, and δ renders the compound charge neutral; and wherein the ionic phase comprises $Zr_{1-x'}Sc_{x'}A_{y'}O_{2-\delta}$, where x' is from about 0.1 to about 0.22, y' is from about 0.01 to about 0.04, and A is Y or Ce or mixtures of Y and Ce. The porous substrate can be formed of $Zr_{1-x''}B_{x''}O_{2-67}$, where x'' is from about 0.05 to about 0.13, B is Y or Sc or Al or Ce or mixtures of Y, Sc, Al, and Ce. The catalyst layer can be formed of composites of reforming catalyst active metals, catalyst promoters and catalyst support materials. The catalyst metal can be one or more of nickel, cobalt, rhenium, iridium, rhodium, ruthenium, palladium, platinum or their combinations. The catalyst support materials are high surface area ceramic composites such as $Al_2O_3$, $ZnO_2$, $CeO_2$, $TiO_2$, or mixture of these materials. The catalyst promoters include CaO, $La_2O_3$, MgO, BaO, SrO, $Y_2O_3$, $K_2O$ or mixtures of these materials. Catalyst metal could also be doped in a high temperature stable structure such as perovskite, pyrochlore, hexaaluminate, spinels, zeolite, or mixture of these materials.

In another embodiment of the present invention the dual function composite oxygen transport membrane further comprises an intermediate porous layer between the dense layer and the first side of the porous substrate wherein the intermediate porous layer is comprised of an electronic phase and the ionic phase.

In yet another embodiment of the present invention the dual function composite oxygen transport membrane further comprises a surface exchange layer overlying the dense layer so that the dense layer is located between the surface exchange layer and the intermediate porous layer and wherein the surface exchange layer comprises an electronic conductor and an ionic conductor; the electronic conductor of the surface exchange layer further comprises $(La_{1-x}M_x)_w Cr_{1-y-z}Fe_yM'_zO_{3-\delta}$, where M: Ba, Sr, Ca; M': Co, Ni, Ru, x is from about 0.1 to about 0.5, w is from about 0.90 to about 1.0, y is from 0.00 to 1, z is from about 0.00 to about 0.2, and δ renders the compound charge neutral; and wherein the ionic phase comprises $Zr_{1-x'}Sc_{x'}A_{y'}O_{2-67}$, where x' is from about 0.1 to about 0.22, y' is from about 0.01 to about 0.04, and A is Y or Ce or mixtures of Y and Ce.

The dual function composite oxygen transport membrane in some embodiments can be configured wherein: the electronic phase of the dense layer comprises $(La_{0.8}Sr_{0.2})_{0.95}Cr_{0.5}Fe_{0.5}O_{3-\delta}$ or $(La_{0.8}Sr_{0.2})_{0.95}Cr_{0.7}Fe_{0.3}O_{3-\delta}$ or $(La_{0.8}Sr_{0.2})_{0.98}Cr_{0.5}Fe_{0.5}O_{3-\delta}$ or $(La_{0.8}Sr_{0.2})_{0.98}Cr_{0.7}Fe_{0.3}O_{3-\delta}$ and the ionic phase of the dense layer comprises $Zr_{0.802}Sc_{0.180}Y_{0.018}O_{2-\delta}$; the electronic phase of the intermediate porous layer comprises $(La_{0.8}Sr_{0.2})_{0.95}Cr_{0.5}Fe_{0.5}O_{3-\delta}$ or $(La_{0.8}Sr_{0.2})_{0.98}Cr_{0.5}Fe_{0.5}O_{3-\delta}$ or $(La_{0.8}Sr_{0.2})_{0.95}Cr_{0.7}Fe_{0.3}O_{3-\delta}$ or $(La_{0.8}Sr_{0.2})_{0.98}Cr_{0.7}Fe_{0.3}O_{3-\delta}$ and the ionic phase of the intermediate porous layer comprises $Zr_{0.802}Sc_{0.180}Y_{0.018}O_{2-\delta}$; the electronic phase of the surface exchange layer comprises $(La_{0.8}Sr_{0.2})_{0.95}Cr_{0.3}Fe_{0.7}O_{3-\delta}$ or $(La_{0.8}Sr_{0.2})_{0.98}Cr_{0.3}Fe_{0.7}O_{3-\delta}$ or $(La_{0.8}Sr_{0.2})_{0.95}Cr_{0.5}Fe_{0.5}O_{3-\delta}$ or $(La_{0.8}Sr_{0.2})_{0.98}Cr_{0.5}Fe_{0.5}O_{3-\delta}$; and the ionic phase of the surface exchange layer comprises $Zr_{0.802}Sc_{0.180}Y_{0.018}O_{2-\delta}$; the porous substrate further comprises $Zr_{0.923}Y_{0.077}O_{2-\delta}$.

The dual function composite oxygen transport membrane can be configured wherein the ionic phase of the dense layer constitute from about 35 percent to about 65 percent by volume of the dense layer; the ionic phase of the intermediate porous layer constitute from about 35 percent to about 65 percent by volume of the intermediate porous layer; the ionic conductor of the surface exchange layer constitute from about 35 percent to about 65 percent by volume of the surface exchange layer.

The dual function composite oxygen transport membrane can be configured, wherein: the porous substrate has a thickness from about 0.7 mm to about 2.5 mm, an average pore size from about 0.5 microns to about 5 microns, and a porosity from about 20 percent to about 50 percent; the intermediate porous layer has a thickness from about 10 microns to about 100 microns, an average pore size from about 0.1 microns to about 1 micron, and a porosity from about 25 percent to about 50 percent; and the surface exchange layer has a thickness from about 10 microns to about 25 microns, an average pore size from about 0.1 microns to about 1 micron, and a porosity from about 25 percent to about 50 percent; and the catalyst layer has a thickness from about 2 microns to 250 microns, an average pore size from about 0.5 microns to about 10 micron, and a porosity from about 50 percent to about 80 percent; preferably the catalyst layer has a porosity greater than the porosity of the porous substrate.

In certain embodiments of the invention the dual function composite oxygen transport membrane can be formed following a sequenced stepwise protocol that comprises forming a layered structure of mixed conducting oxygen transport materials on a first side of a porous substrate, and forming a catalyst layer on an opposing second side of the porous substrate in separate steps. Furthermore, the formation of a layered structure of mixed conducting oxygen transport materials comprises contacting the first side of the porous substrate with one or more slurries containing some common and some different ingredients to build the layered structure with layers differing in composition, properties and/or surface characteristics. The layered structure formed is an overlay structure wherein an intermediate porous layer is first formed on the first side of the porous substrate, next a dense layer is formed over the intermediate porous layer, and then a surface exchange layer is optionally formed over the dense layer. The catalyst layer is formed on the opposing second side of the porous support using a wash-coating technique.

BRIEF DESCRIPTION OF THE DRAWING

While the specification concludes with claims distinctly pointing out the subject matter that applicants regard as their invention, it is believed that the invention would be better understood when taken in connection with the accompanying figures wherein like numbers denote same features throughout and wherein:

DETAILED DESCRIPTION

Dual Function Composite Oxygen Transport Membrane

Figure 1:
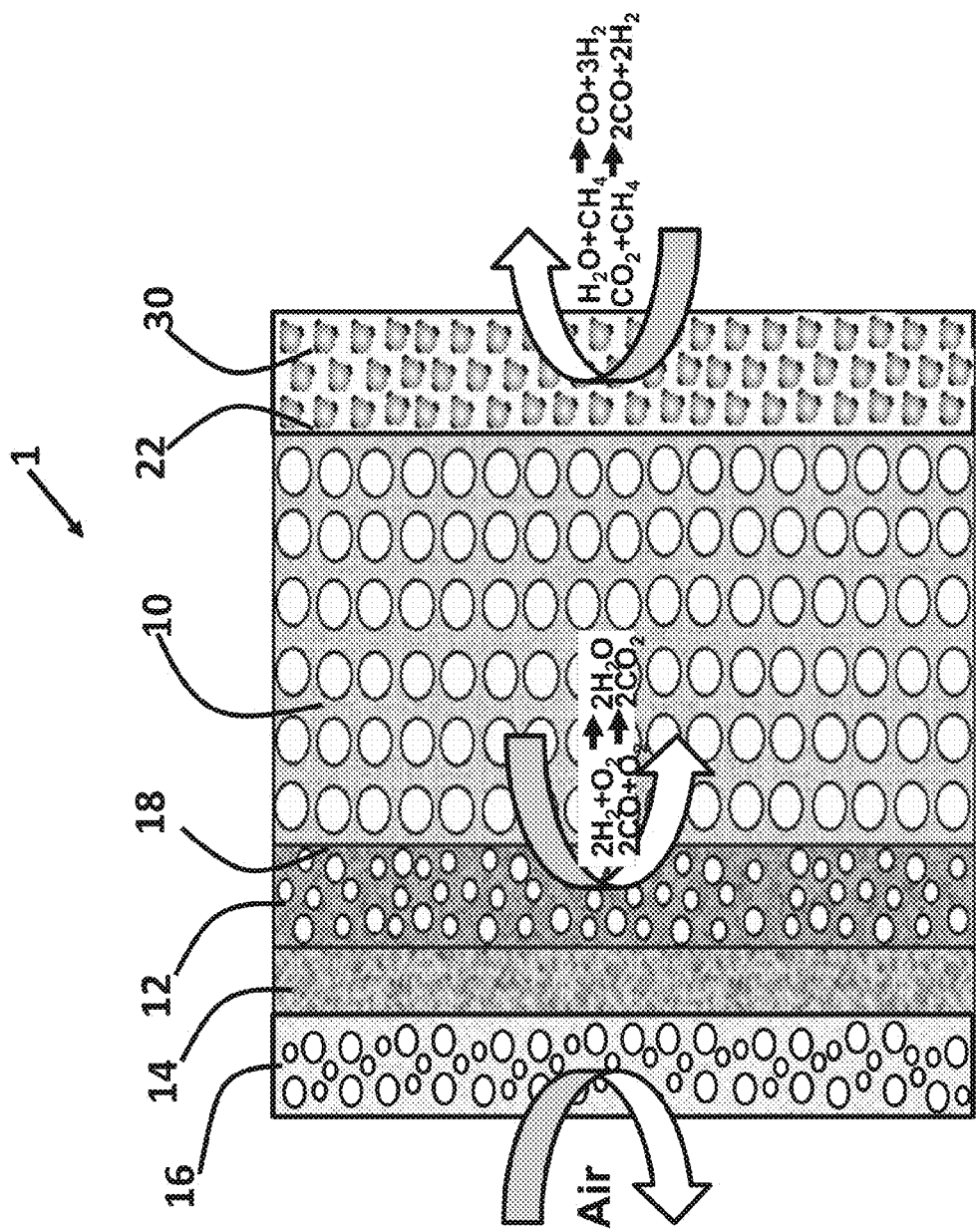
FIG. 1 is a cross-sectional schematic view of a dual function composite oxygen transport membrane.

With reference to FIG. 1, a sectional, schematic view of a dual function composite oxygen transport membrane 1 of the present invention is illustrated. Dual function composite oxygen transport membrane 1 has a porous substrate 10 that has a first side 18 and an opposing second side 22. The porous substrate serves as a building block of the dual function composite oxygen transport membrane that supports layers of different functional materials located on either side of the substrate. As could be appreciated by those skilled in the art, such dual function composite oxygen transport membrane 1 could be configured as a dual function composite oxygen transport membrane element in the form of a tube or a flat plate. Such composite oxygen transport membrane tube or plate would be one of a series of such elements situated within a device to carry out chemical conversions such as converting a hydrocarbon gas into syngas by endothermic reforming reactions. In an application such as desiring syngas as the product, the dual function composite oxygen transport membrane can be configured as a tube made up of a porous substrate (also referred to as porous support) 10 with a plurality of oxygen transport mixed conducting layers on the first side (outside surface also referred to as exterior surface of the tube) 18, and a reforming catalyst layer on the opposing second side (inside surface also referred to as interior surface of the tube) 22.

Porous Support

The porous substrate 10 could be formed from partially stabilized zirconia oxide e.g. 3, 4 or 5 mole % yttria stabilized zirconia or fully stabilized zirconia. Alternatively the porous substrate can be formed from a mixture of MgO and $MgAl_2O_4$. Alternatively the porous substrate could be a porous metal, although not part of the present invention. As would be appreciated by those skilled in the art, porous substrate 10 also referred to as porous support or porous support layer should provide as open an area as possible while still being able to be structurally sound in its supporting function. Porous support structures for application in composite oxygen transport membranes are best characterized in terms of their porosity, strength and effective oxygen diffusivity. The porous support forms the mechanical support for the "active" membranes layers, so should have sufficient strength at high temperatures. A typical support structure in this application would have total porosity in the range of about 20 to about 50%. An important property of the porous substrate is the ability to allow gaseous species such as $H_2$, CO, $CH_4$, $H_2O$ and $CO_2$ to readily move through the porous support structure to and from the membrane 'active' layers. The ability of the substrate to allow gaseous transport can be characterized by effective oxygen diffusivity, $D_{\it{eff}\ O2-N2}$. For this application it has been determined that a $D_{\it{eff}\ O2-N2}$ more than 0.005 $cm^2/s$ measured at room temperature is preferred. The porous substrate should also possess a thermal expansion coefficient not more than 10% different from that of the membrane 'active' layers between room temperature and membrane operation temperature.

Oxygen Transport Mixed Conducting Layers

The oxygen transport mixed conducting layers comprise a first mixed conducting layer 12 also referred to as first layer or intermediate porous layer or innermost mixed conducting layer, a second mixed conducting layer 14 also referred to as second layer or dense layer or impervious dense layer, and a third mixed conducting layer 16 also referred to as third layer or surface exchange layer or outermost mixed conducting layer. These layers are formed on the first side 18 of the porous substrate 10. A catalyst layer is formed on the opposing second side 22 of the porous substrate. The dual function composite oxygen transport membrane is specifically designed to function in an environment in which air or oxygen containing stream is introduced and contacted with the outermost mixed conducting layer on the first side 18, and a fuel or other combustible substance is introduced and contacted with the catalyst layer on the opposing second side 22 of the porous substrate 10. The fuel is subjected to combustion supported by permeated oxygen to provide the partial pressure difference necessary to drive oxygen transport and also to heat the membrane to an operational temperature at which oxygen transport will occur. As such, the first layer 12, which, as will be discussed, serves as a porous fuel oxidation layer at which fuel combusts with permeated oxygen. This porous oxidation layer may optionally include a combustion catalyst to promote combustion reactions. In this regard, the term "fuel" when used in connection with this layer, both herein and in the claims, is not intended to be limiting, but rather, to indicate and include any substance that can be oxidized through permeation of oxygen through the membrane. The second layer 14 is a gas tight active dense layer that is impervious to gas and allows only ion transport, in this case principally to oxygen ions, and is commonly referred to as dense layer or dense separation layer. The third layer 16 serves to initially reduce the oxygen in oxygen containing gas such as air contacting the third layer into oxygen ions and thus serves as a porous surface activation layer. Each of the first layer 12, the second layer 14 and the third layer 16 after heating and sintering will preferably each have a thickness of about 10 μm to about 100 μm.

Turning attention to the composition of the oxygen transport mixed conducting layers, a stabilized zirconia, namely, $Zr_{1-x-y}A_xB_yO_{2-\delta}$ is a common material in all three "active" membrane layers, namely, the first layer 12, the second layer 14 and the third layer 16. As mentioned above in all of these layers oxygen transport occurs and as such, are "active". In order to generate industrially relevant levels of oxygen ion conductivity, A and B are typically Sc, Y, Ce, Al or Ca. Preferably, such stabilized zirconia has a composition given by formula: $Zr_{0.802}Sc_{0.180}Y_{0.018}O_{2-\delta}$, often noted as 10Sc1YSZ in literature associated with this class of membrane. However it should be noted that many different combinations of Sc, Y, Ce, Al, Ca or other elements can be substituted to achieve the same end. The first layer 12, intermediate porous layer is configured to have a high surface area where fuel can react with oxygen or oxygen ions that recombine and become available. The second layer 14, the dense layer, functions to separate oxygen from an oxygen containing feed in contact with the third layer, porous surface exchange layer 16 and contains an electronic and ionic conducting phases. As discussed above, the electronic phase of $(La_{1-x}Sr_x)_wCr_{1-y-z}Fe_yM'_zO_{3-\delta}$, where M' is a metal: Co, Ni, Ru, x is from about 0.1 to about 0.5, w is from about 0.90 to about 1.0, y is from 0.00 to 1, z is from about 0.00 to about 0.2, and δ renders the compound charge neutral. The ionic phase is $Zr_{1-x'-y'}Sc_{x'}A_{y'}O_{2-\delta}$, where x' is from about 0.1 to about 0.22, y' is from about 0.01 to about 0.04 and A is Y or Ce or a mixture of Y and Ce. The porous support layer 10 is formed of $Zr_{1-x''}A_{x''}O_{2-\delta}$, where x" is from about 0.05 to about 0.13, A is Y or Sc or Al or Ce or mixtures thereof. The third layer 16, a surface exchange layer is formed from a mixture of particles of $(Ln_{1-x}A_x)_wCr_{1-y}B_yO_{3-\delta}$ and 10Sc1YSZ and optionally pore formers. In this layer, Ln is La, Y, Pr, Ce or Sm, A is Ca, Sr, Ba, B can be Mn, Fe, Co Al, Ti or combinations thereof; w is 0.9 to 1.1, x is 0.1 to 0.4 and y is 0.1 to 0.6. The $(Ln_{1-x}A_x)_wCr_{1-y}B_yO_{3-\delta}$ and 10Sc1YSZ of this layer after sintering should be present within a first volume ratio of between 2 to 3 and 4 to 1 on a volume percentage basis.

Reforming Catalyst Layer

A reforming catalyst layer 30 is located on the second side 22 of the porous substrate 10, separated (spaced apart) from the first layer 12 located on the first side 18 of the porous substrate 10. The formation of this catalyst layer on the second side 22 of the substrate is carried out as a separate step after formation of at least the dense layer 14 on the first side of the substrate. Highly porous reforming catalyst layer accelerates the endothermic hydrocarbon reforming to produce syngas. The separation between the oxygen transport layer and the reforming catalyst layer protects the metal catalysts from exposure to both oxidative and reducing environments and avoids catalyst redox cycles and internal stress buildup.

Common catalyst coating techniques such as wash-coating, dip-coating, spray deposition, and tape-casting of suspension or sol-gel catalyst slurry can be applied to form the catalyst layer 30. The ingredients of a coating slurry can include one or more of the following: catalyst in the form of metal or metal oxide or metal precursors such as metal nitrate, ceramic support oxides as catalyst carriers, high temperature stabilizers and promoters, organic binders such as polyvinyl butyral (PVB), and optionally one or more pore formers (e.g., carbon black, walnut shell, and Poly-methyl methacrylate with either aqueous or alcohol or toluene solvents. Alternately mixtures of catalyst metal and ceramic carrier powders or commercially available supported catalyst powders can be milled down to desired particle size to prepare the slurry for coating on the substrate layer. Yet another alternate is to pre-coat the porous ceramic composites such as $Al_2O_3$, YSZ, $CeO_2$ on the substrate layer of the dual function composite oxygen transport membrane and then impregnate the coated porous ceramic composite with catalyst metal precursors.

The preferred reforming catalysts include nickel, cobalt, rhenium, iridium, rhodium, ruthenium, palladium, platinum, or their combinations. The catalyst carrier candidates could be high surface area ceramic materials such as $Al_2O_3$, $ZnO_2$, $CeO_2$, $TiO_2$, pervoskite, pyrochlore, hexaaluminate supports, or mixtures of these materials. The high temperature promoters may include CaO, $La_2O_3$, MgO, BaO, SrO, $Y_2O_3$, $K_2O$, spinel structured materials, or mixtures of these materials. Organic binders not only determine the coating layer adhesion, but also affect the micro-tunnels in the catalyst layer. So it is preferred to be pre-mixed with alcohol solvent (e.g., 12 wt. % PVB in IPA) to enhance its homogenous mix before adding into other ingredients.

If included, the pore former particle size and loading are preferably in the ranges of 0.5 to 8 μm and 15 wt % to 35 wt %, respectively. These pore formers are determined to develop a highly porous network of catalyst coating layer on the porous substrate and prevent blockage of gas flow paths in both catalyst layer and porous substrate. They facilitate desired porosity (preferably 55% to 70% porosity). The particle size of ceramic oxides is preferred to be close to or greater than the diameter of the support layer microchannel to minimize particle impregnation into the support layer and blockage of gas flow through the channel. Thickness of porous catalyst coating can be controlled by slurry viscosity and coating times and is preferred to be greater than about 5 microns, more preferably in the range of about 40 microns to about 150 microns to provide a mechanically stable catalyst layer having sufficient surface area to obtain desired methane conversion. Catalyst layers that are thicker, for example greater than 200 microns, may be structurally less stable, developing cracks and/or delaminate. It is preferred to have thermal shrinkage rate of the catalyst layer to be the same or as close as possible to that of the porous substrate to prevent layer delamination and/or cracking; this can be achieved for example by proper choice of composition and/or thickness of catalyst layer.

Figure 2:
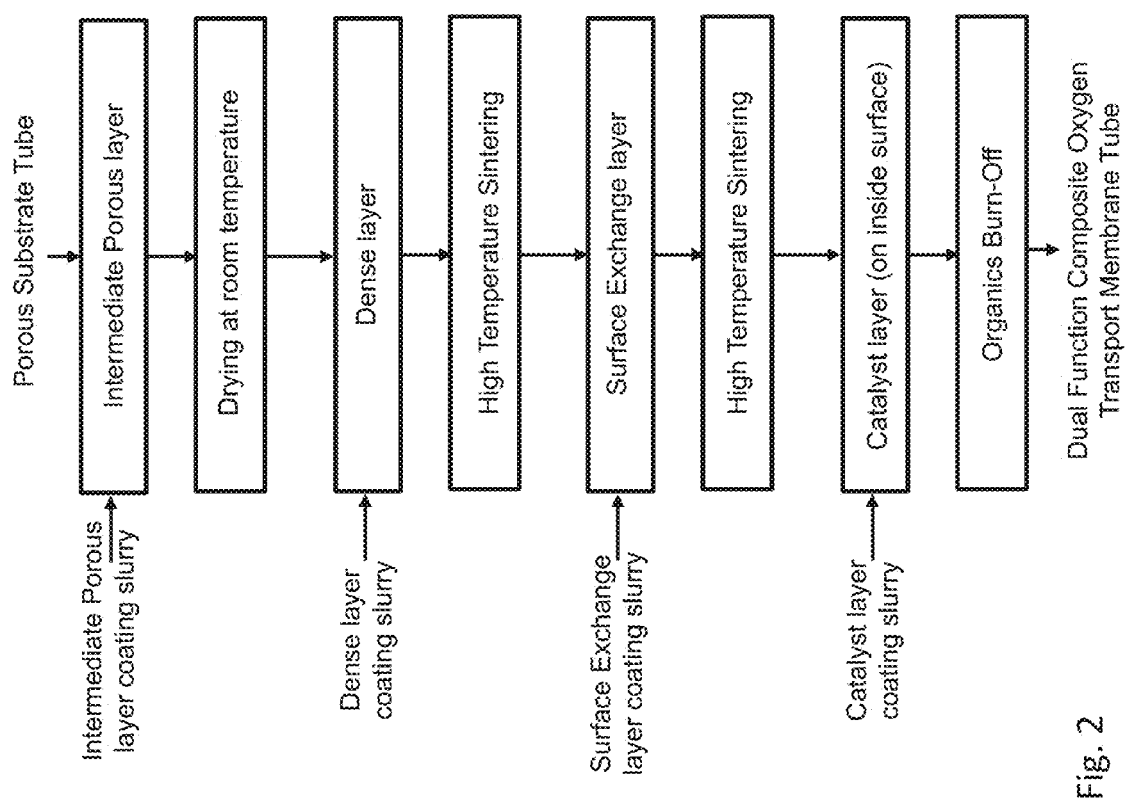
FIG. 2 is a process flow diagram for the production of the dual function composite oxygen transport membrane of the present invention.
Figure 3:
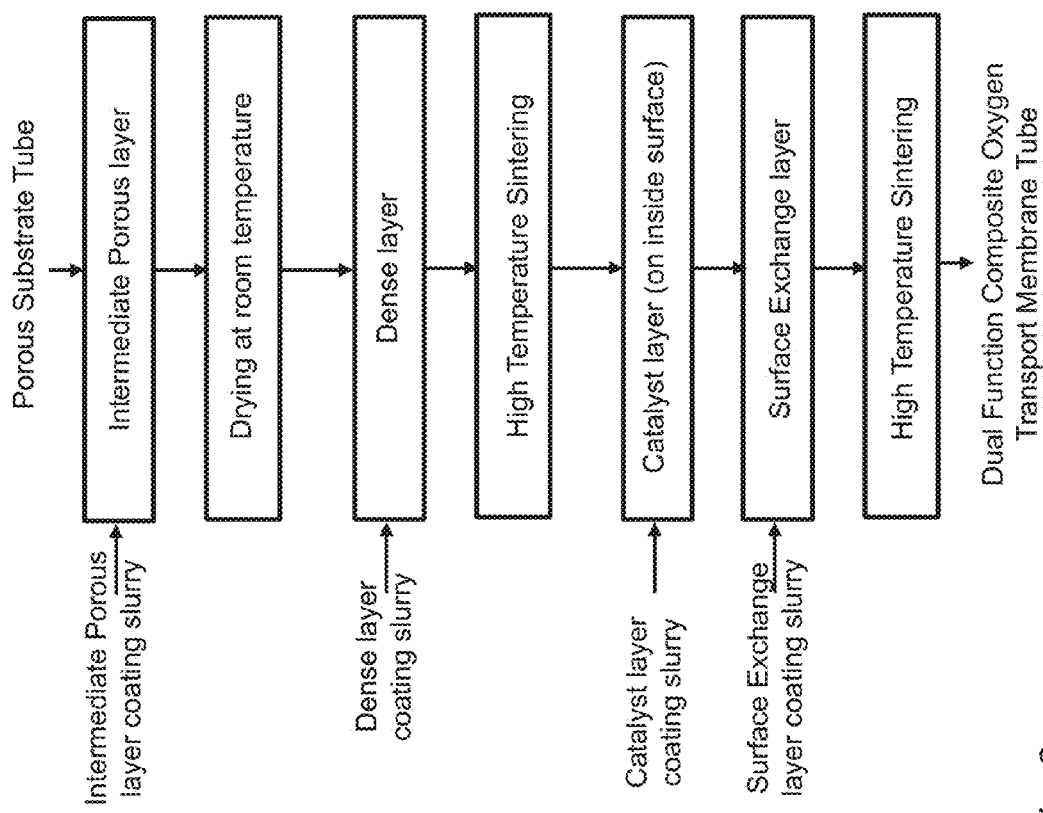
FIG. 3 is an alternate process flow diagram for the production of the dual function composite oxygen transport membrane of the present invention.

The catalyst coating process can be implemented at different steps in the manufacturing of the dual function composite oxygen transport membrane. As shown in FIG. 2, first all three oxygen transport mixed conducting layers, namely intermediate porous layer, dense layer, and surface exchange layer are formed and then catalyst layer is coated. FIG. 3 show another approach in which only intermediate porous layer and dense layer are first formed, then catalyst layer coated on the inside of the tube followed by surface exchange layer formation over the dense layer to complete the oxygen transport membrane architecture on the outside of the tube. Preferably the catalyst coating step should be introduced after at least dense layer was formed to avoid adverse effects of exposure for long periods of time to high temperatures required to sinter the dense layer; formation of inactive spinel structure of transitional metals such as $NiAl_2O_4$ in the catalyst layer could be accelerated; the catalyst layer could lose porosity, pore structures as well as surface area, and result in significant catalyst activity reduction.

It is preferred to integrate catalyst coating right before or after the surface exchange (cathode) layer coating, because these two coating layers are on the opposite side of the membrane and could be sintered by co-firing at the same time. The thicknesses of intermediate mixed conducting porous (anode) layer, dense layer, and surface exchange porous (cathode) layer of a dual function composite oxygen transport membrane can be about 10 μm to 100 μm each, while the catalyst layer with porosity of 70% and pore size of 6 μm can have a thickness of about 20 μm to 200 μm. Highly porous catalyst surface geometry offers reduced diffusional resistance and provides significantly more catalytic surface area.

Figure 4:
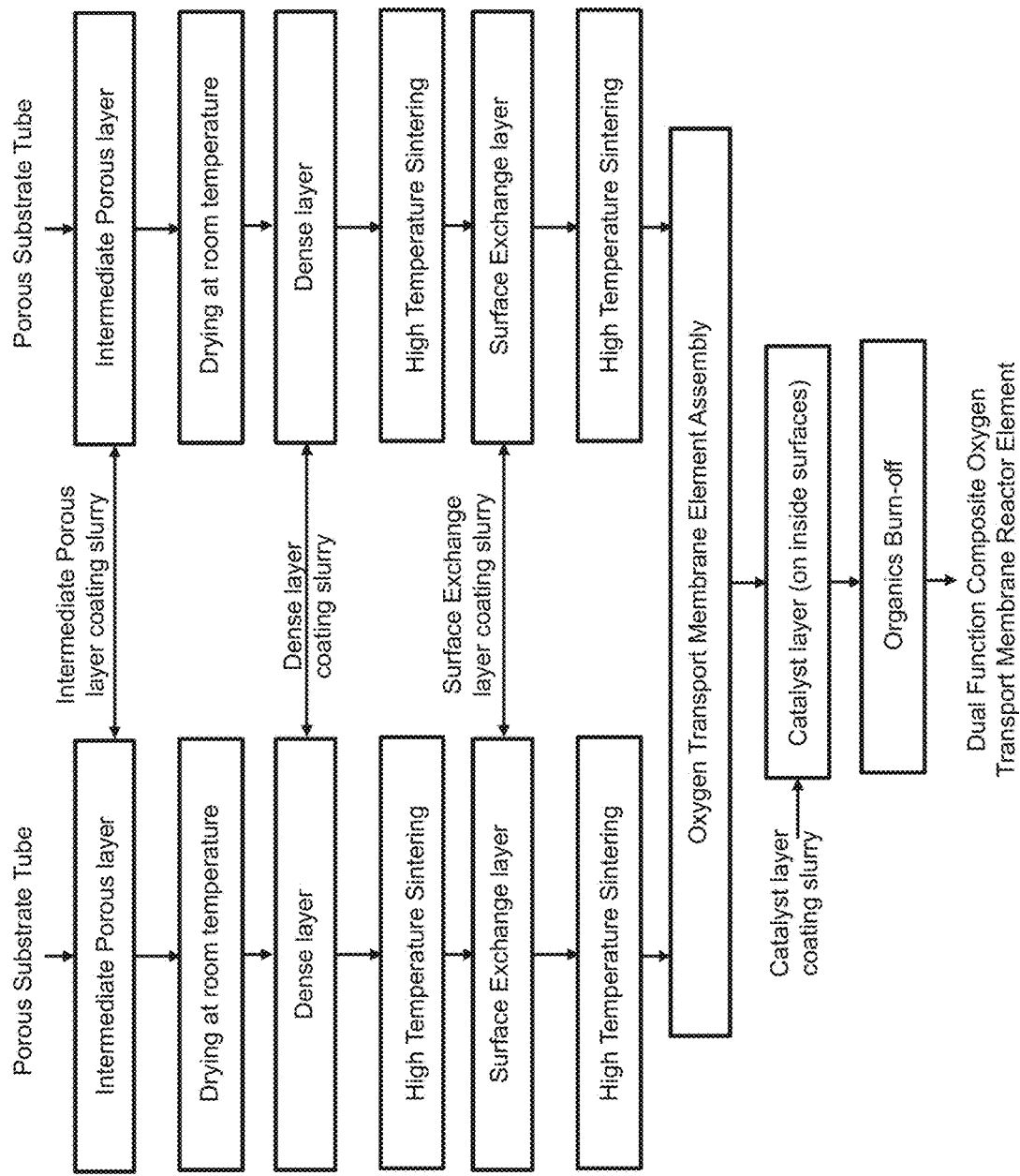
FIG. 4 is an alternate process flow diagram for the production of the dual function composite oxygen transport membrane of the present invention.

Yet another approach, shown in FIG. 4 is to first form a reactor element comprising at least a first porous support tube (or some other geometry) with mixed conducting oxygen transport layers on the outside surface and a second porous tube (or some other geometry) also with mixed conducting oxygen transport layers on the outside, that are coupled together to provide a continuous flow path to a fluid introduced at one end of the first tube to exit at the other end of the second tube. The catalyst layer is then deposited on the inside surface of the porous support tubes that already have undergone formation of the three oxygen transport mixed conducting layers in a layered structure, namely intermediate porous layer, dense layer, and surface exchange layer on the outside surface of the substrate tube. Such reactor elements are discussed in pending U.S. Patent Publication 2015/0098872, which is incorporated herein by reference.

Catalyst Layer Benefits

The dual function composite oxygen transport membrane is operated at relatively high temperature (above 950° C.) and can advantageously produce high quality of syngas while sustaining high oxygen flux performance. Furthermore, the catalytic reforming of hydrocarbon fuels by the dual function composite oxygen transport membrane enhances syngas yield, considerably lowers methane slip and could facilitate elimination of downstream methane removal depending on syngas end use process.

The endothermic reforming of methane catalyzed by the dual function composite oxygen transport membrane catalyst layer produces hydrogen and carbon monoxide. Some of the hydrogen and/or carbon monoxide produced can diffuse into the porous substrate that is an integral part of the dual function composite oxygen transport membrane, and react with oxygen permeating the dense layer within the dual function composite oxygen transport membrane. The exothermic oxidation reactions consume permeated oxygen, facilitating a difference in partial pressure of oxygen across the membrane.

The dual function composite oxygen transport membrane can advantageously manage the heat released from oxycombustion of fuel species with permeated oxygen that occurs in and near the intermediate porous layer. These exothermic reactions generate a considerable amount of heat, some of which supports endothermic reactions such as hydrocarbon reforming catalyzed by the catalyst layer located on the porous substrate. The porous substrate separating the intermediate porous layer and the catalyst layer may have a thickness several orders in magnitude to that of any of these layers. A temperature gradient exists with heat flowing from the oxy-combustion reaction region to the endothermic reforming region. This helps prevent dual function composite oxygen transport membrane oxygen flux reduction due to over cooling from catalytic reforming.

Fabrication Method

With reference to FIG. 2, the process flow for producing a dual function composite oxygen transport membrane in accordance with one aspect of the present invention is provided.

The porous substrate 10 is first formed in a manner known in the art. For example, using an extrusion process the porous substrate could be formed into a tube in a green state and then subjected to a bisque firing at 1050° C. for 4 hours to achieve reasonable strength for further handling. After firing, the resulting porous substrate tube can be checked for porosity and permeability. Then oxygen transport mixed conducting layers, namely intermediate porous layer 12, dense layer 14 and surface exchange layer 16 can be formed on the porous substrate, for example as discussed in U.S. Pat. No. 8,795,417.

Table 1 lists the ingredients used to form the oxygen transport mixed conducting layers on a tubular porous substrate in the examples described below. The ionic conductive and electronic conductive materials used to form intermediate porous layer and dense layer in the examples are same, however this need not be the case. $Zr_{0.802}Sc_{0.180}Y_{0.018}O_{2-\delta}$ (d50<0.6 μm; from Daiichi Kigenso Kagaku Kogyo Co., Ltd.) was used as ionic conductive material and $(La_{0.8}Sr_{0.2})_{0.98}Cr_{0.5}Fe_{0.5}O_{3-\delta}$ perovskite powder (d50 in the range of about 0.30 μm to about 0.35 μm; Praxair Specialty Ceramics) was used as electronic conductive material.

TABLE 1

| Oxygen transport mixed conducting layer | Ionic conductive composite | Electronic conductive composite | Binder | Solvent | Pore former |
|---|---|---|---|---|---|
| Intermediate porous layer | $Zr_{0.802}Sc_{0.18}Y_{0.018}O_{2-\delta}$ | $(La_{0.8}Sr_{0.2})_{0.98}Cr_{0.5}Fe_{0.5}O_{3-\delta}$ | Ferro B73210 | Toluene | Carbon black |
| Dense layer | $Zr_{0.802}Sc_{0.18}Y_{0.018}O_{2-\delta}$ | $(La_{0.8}Sr_{0.2})_{0.98}Cr_{0.5}Fe_{0.5}O_{3-\delta}$ | Ferro B73210 | Toluene | N/A |
| Surface exchange layer | $Zr_{0.802}Sc_{0.18}Y_{0.018}O_{2-\delta}$ | $(La_{0.8}Sr_{0.2})_{0.98}Cr_{0.3}Fe_{0.7}O_{3-\delta}$ | Ferro B73210 | Toluene | Carbon black |

For the dense layer, a 120 g batch of slurry was prepared using 51 g of $(La_{0.8}Sr_{0.2})_{0.98}Cr_{0.5}Fe_{0.5}O_{3-\delta}$ mixed with 69 g of $Zr_{0.802}Sc_{0.180}Y_{0.018}O_{2-\delta}$, 60 g Ferro B73210 binder, 255 g Toluene and 1200 g of 1.5 mm diameter YSZ milling media in a 32 oz NALGENE bottle. The mixture was milled for about 2.25 hours or until the particle size of the mixture was in the range 0.3-0.35 μm. For the intermediate layer, slurry was prepared by adding 18 g of carbon black (pore former) to the dense layer recipe.

For the surface exchange layer 16, 51 g of electronic conductive material $(La_{0.8}Sr_{0.2})_{0.98}Cr_{0.3}Fe_{0.7}O_{3-\delta}$ perovskite powder (from Praxair Specialty Ceramics) was mixed with 69 g of ionic conductive material $Zr_{0.802}Sc_{0.180}Y_{0.018}O_{2-\delta}$, 60 g Ferro B73210 binder, 255 g Toluene, 18 g carbon black and 1200 g of 1.5 mm diameter YSZ milling media in a 32 oz NALGENE bottle. The mixture was milled for about 2.25 hours or until the particle size of the mixture was in the range 0.3-0.35 μm.

The tubular porous substrate structure was first coated with the intermediate porous layer by contacting the outside surface of the tubular porous substrate structure with the intermediate layer slurry, at least twice to ensure final thickness was in the range of about 10 to about 30 μm. The dried intermediate layer was then coated by contacting with a dense layer slurry, at least two times to ensure final thickness was in the range of about 10 μm to about 30 μm. Resulting coated tubular structure was then dried at room temperature for about 1 to 2 hours before sintering at an elevated temperature above 1350° C.-1400° C. for 6 hours in a nitrogen environment. The sintered dense layer was then subjected to a surface exchange layer coating step by contacting the sintered dense layer with a surface exchange layer slurry. This was followed by a drying step (at room temperature for 1 to 2 hours), and a high temperature sintering step (air fired at 1250° C. for half an hour) to complete the surface exchange layer formation.

Catalyst layer 30 can be formed preferably by a wash-coating technique. As shown in FIG. 2, the catalyst layer formation step can be introduced into the manufacturing process after surface exchange layer formation. The catalyst formation step comprises a catalyst layer coating step, followed by optional air drying and organics burn-off. The catalyst layer coating step comprises contacting the inside surface of the tubular porous substrate structure with a catalyst layer slurry also referred to as catalyst coating layer slurry. The air drying and organics burn-off can be carried out as separate steps or combined into a single step. FIG. 3 shows an alternate process flow for producing a dual function composite oxygen transport membrane wherein the catalyst layer coating step is carried out prior to the surface exchange layer high temperature sintering step, and preferably prior to the surface exchange layer coating step. The catalyst layer organics burn-off step and the surface exchange layer high temperature sintering step can be merged into a single step or can be carried out simultaneously while providing atmospheres and operating conditions (temperatures, pressures, and flows) to the catalyst layer that are appropriate for organics burn-off, and to the surface exchange layer that are appropriate for high temperature sintering. This way process efficiency gains, as well as capital and operating cost savings can be achieved. FIG. 4 shows yet another process flow wherein a plurality of oxygen transport membrane elements having mixed conducting oxygen transport layers on the outside surface are treated to form a catalyst layer on the inside surface of each element, thereby transforming them into dual function composite oxygen transport membrane reactor elements.

Table 2 lists the ingredients used to form catalyst layer in the dual function composite oxygen transport membrane examples described below.

TABLE 2

| Active metal | Metal precursor | Promoter | Ceramic carrier | Binder | Solvent | Pore former | Dispersant agent |
|---|---|---|---|---|---|---|---|
| Ni—Rh | $Ni(NO_3)_2 \cdot 6H_2O$, $Rh(NO_3)_3$ | TZ-4YS | Alpha-$Al_2O_3$ | 12 wt. % PVB in ethanol | Ethanol | PMMA | KD-2 |
| Ru | $(La_{0.8}Sr_{0.2})_{0.98}Cr_{0.8}Fe_{0.15}Ru_{0.05}O_{3-\delta}$ | N/A | N/A | Ferro B73210 | Toluene | Carbon black | KD-1 |

Example 1: Nickel-Rhodium Based Catalyst Layer after Surface Exchange Layer Sintering (FIG. 2)

25 g of Alpha-phase aluminum oxide (1 μm average particle size, 8 to 10 $m^2/g$ surface area, from Alfa Aesar) and 8.5 g of TZ-4YS with 4 mole % yttria stabilized zirconia powder (0.5 μm average particle size, from Tosoh Corporation) were dispersed in 200 mL of ethanol and 7 mL of KD-2 dispersant agent (Hypermer™). Adding 500 g of 1.5 mm diameter YSZ milling media into the container, the mixture was milled on the roller mill (170 to 175 rpm) for 2 hours. The final particle size of the slurry was in the range of about 0.5 to about 0.8 μm. Along with 10 g of pore former poly(methyl methacrylate) PMMA with average particle size of 6 μm, 30 g of nickel nitrate hexahydrate Ni $(NO_3)_2.6H_2O$ and 0.5 g of $Rh(NO_3)_3$ (both from Sigma-Aldrich) were added into the mixture and mixed for additional one hour. 12% by weight of plastic binder polyvinyl butyral powder was first dissolved in ethanol solvent to enhance its homogenous mixing and then 150 mL of resulting binder solution was slowly added into the slurry mixture. The resulting mixture was further milled for 1.5 hours to form sol-gel slurry.

The above prepared sol-gel slurry can be used to form a catalyst layer containing Ni and Rh as active metals. Alternately the sol-gel slurry can be prepared without the addition of $Rh(NO_3)_3$ to form a catalyst layer containing Ni as the active metal. The Ni and Rh containing, as well as, Ni only catalyst layer can be formed on the inside of a tubular composite oxygen transport membrane.

Figure 5:
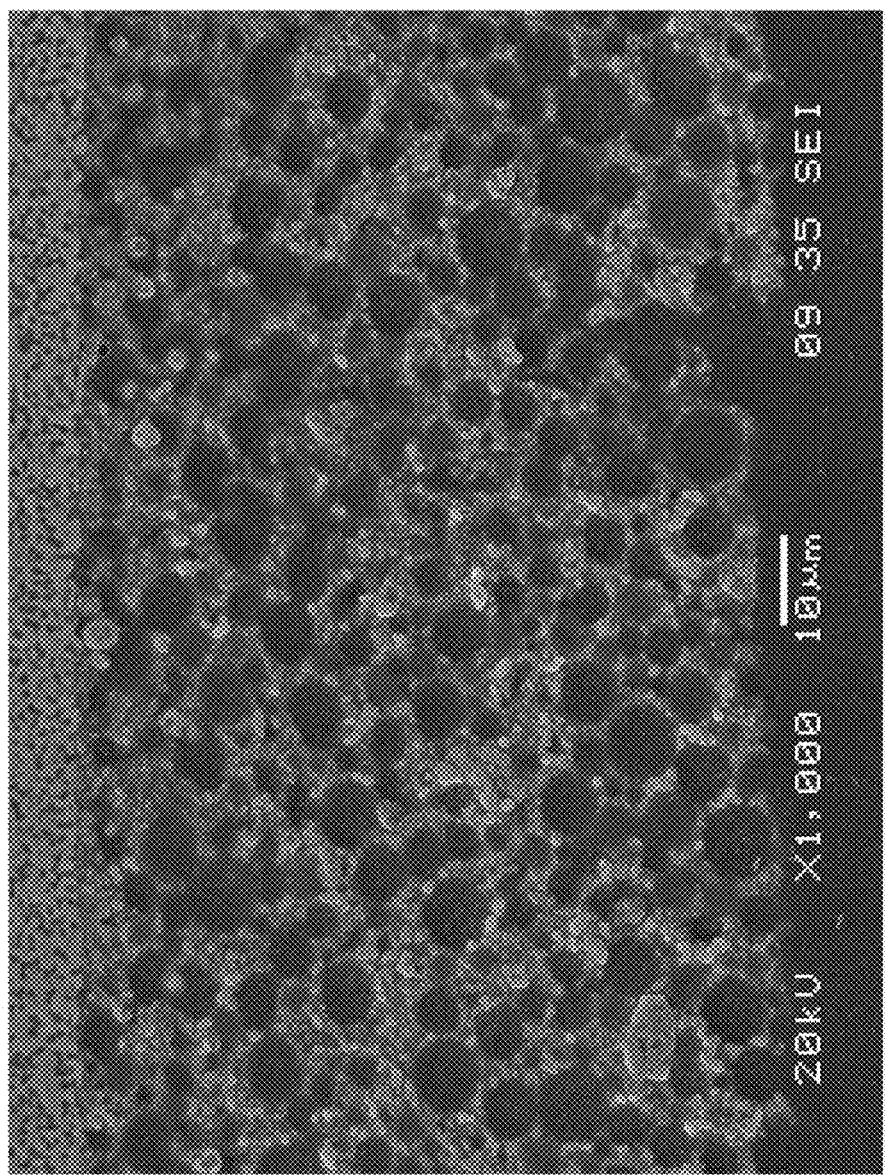
FIG. 5 thru FIG. 8 show SEM micrographs of cross-sections of internal surfaces of catalyst layers formed according to present invention.

The sol-gel slurry prepared as described above and having a viscosity preferably in the range of about 25 centipoise to about 50 centipoise was used to wash-coat a catalyst layer on the inside surface of a yttria-stabilized zirconia (YSZ) porous substrate tube already coated with oxygen transport mixed conducting layers on the outside surface. The tube, 7 mm ID and 24 inches long had been made from a YSZ paste by a conventional extrusion process followed by bisque firing at elevated temperature. Tubes made this way can have a wall thickness in the range of about 0.7 mm to about 2.5 mm, sufficient to operate at elevated temperatures and pressures. The particular tube used in this example had a wall thickness of 1 mm. The porosity of tube is preferred to be within the range of 25 to 45% for this application. The particular tube used in this example had a porosity of 34%. Oxygen transport mixed conducting layers, namely: surface exchange layer, dense layer, and intermediate porous layer formed on the outside surface of the porous support (YSZ) tube contained mixed ionic and electronic conductive (MIEC) dual-phase materials. After forming the intermediate layer and dense layer on the YSZ support tube, the tube was dried at room temperature and then sintered at an elevated temperature of about 1350° C. to about 1400° C. to have a thickness in the range of about 10 microns to about 30 microns. Then after treating the tube with surface exchange layer slurry, the tube was sintered at an elevated temperature of about 1250° C. to complete the formation of surface exchange layer. The composite oxygen transport membrane tubes prepared in this manner are preferred to have a thickness in the range of about 10 microns to about 30 microns. The particular tube used in this example had an intermediate layer about 15 microns thick, a dense layer about 15 microns thick, and a surface exchange layer about 10 microns thick. Prior to wash-coating, the tube was inspected and appropriate measures taken to remove any dust on the inside surface of the tube, for example by blowing air through the tube. The tube vertically positioned and with one end plugged was gradually filled with sol-gel slurry until the inside of the tube was completely filled. The liquid level slightly dropped due to potential migration of liquid into the porous substrate by capillary action; as needed slurry was added to keep the tube completely filled. After waiting for about a minute the slurry was slowly drained out of the tube, and the tube dried at room temperature by flowing air for about 30 minutes at a low flow rate, in the range of about 10 scfh to about 40 scfh. An inert dry gas can be used instead of air for drying. The organic binder and pore former in the catalyst layer were burned off by vertically fixing the catalyst coated tube in a furnace and heating at a ramp rate of 2° C./min to 600° C. and holding at that temperature for one hour. After the burn-off procedure the tube was cooled to ambient temperature. Catalyst loading in the resulting dual function composite oxygen transport membrane was 0.48 g, as calculated by weighing the tube before wash-coating and after cool down. The SEM microstructure of a cross-section of this catalyst layer shown in FIG. 5 suggests catalyst layer thickness to be about 75 μm.

Example 2: Thinner Nickel-Rhodium Based Catalyst Layer after Surface Exchange Layer Sintering (FIG. 2)

Figure 6:
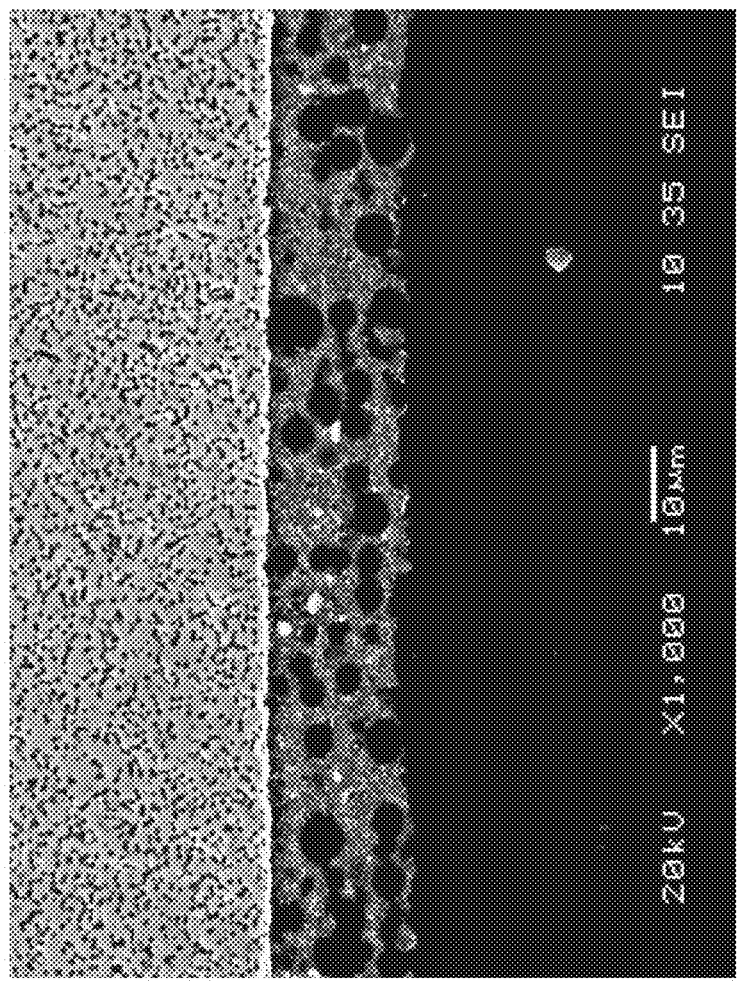

Another porous tube with oxygen transport mixed conducting layers formed on the outside was inspected, cleaned off any dust and filled with catalyst layer sol-gel slurry prepared as described above in Example 1. In this instance the sol-gel inside the tube was held for about 5 seconds rather than for about one minute prior to initiating the draining process. The tube was then subjected to the same steps and conditions of: air drying, organic binder and pore former burn off and cool down as described above. Catalyst loading in the resulting dual function composite oxygen transport membrane was 0.11 g, as calculated by weighing the tube before wash-coating and after cool down. The SEM microstructure of a cross-section of this catalyst layer shown in FIG. 6 suggests catalyst layer thickness to be about 15 μm. The sol-gel slurry holding time in the tube prior to draining appears to be an important factor in determining the catalyst layer thickness.

Example 3: Ru-Pervoskite Based Catalyst Layer after Surface Exchange Layer Sintering (FIG. 2)

25.5 g of $(La_{0.8}Sr_{0.2})_{0.98}Cr_{0.8}Fe_{0.15}Ru_{0.05}O_{3-\delta}$ (particles ranging from 0.2 microns to 0.4 microns, obtained from Praxair Specialty Ceramics) was dispersed in 25 g of toluene solvent (purity>99.5%) along with 5 g of plastic Ferrobinder. Adding 200 g of 1.5 mm YSZ media into the slurry container, the mixture was milled on the roller mill (170 to 175 rpm) for 2 hours. The final particle size of the slurry was about 0.35 microns. Then 4.5 g of pore former such as carbon black (particle size ranging from 0.5 microns to 1.0 micron) was added and milling of the mixture continued for 1 hour. Finally 0.3 g of dispersant (KD-1) dissolved in 15 g of solvent was added to the slurry mixture and milling continued for additional 1 hour. The resulting sol-gel slurry was then used to wash coat a 7 mm ID, 24 inches long YSZ porous tube already coated with oxygen transport mixed conducting layers following similar steps of inspecting, plugging one end, filling, adding slurry to keep the tube completely filled, waiting for about one minute, then draining liquid from the tube, air drying, burning off of organic binder and pore former material, and cool down. In this instance the catalyst loading was 0.6 g. The SEM microstructure of a cross-section of this catalyst layer suggested catalyst layer thickness to be about 62 μm.

Example 4: Nickel-Rhodium Based Catalyst Layer and Surface Exchange Layer Co-Firing (FIG. 3)

25 g of Alpha-phase aluminum oxide (1 μm average particle size, 8 to 10 m²/g surface area, from Alfa Aesar) and 8.5 g of TZ-4YS with 4 mole % yttria stabilized zirconia powder (0.5 μm average particle size, from Tosoh Corporation) were dispersed in 200 mL of ethanol and 7 mL of KD-2 dispersant agent (Hypermer™). Adding 500 g of 1.5 mm diameter YSZ milling media into the container, the mixture was milled on the roller mill (170 to 175 rpm) for 2 hours. The final particle size of the slurry was in the range of about 0.5 to about 0.8 μm. Along with 10 g of pore former poly(methyl methacrylate) PMMA with average particle size of 6 μm, 30 g of nickel nitrate hexahydrate Ni$(NO_3)_2 \cdot 6H_2O$ and 0.5 g of $Rh(NO_3)_3$ (both from Sigma-Aldrich) were added into the mixture and mixed for additional one hour. 12% by weight of plastic binder polyvinyl butyral powder was first dissolved in ethanol solvent to enhance its homogenous mixing and then 150 mL of resulting binder solution was slowly added into the slurry mixture. The resulting mixture was further milled for 1.5 hours to form sol-gel slurry. The resulting sol-gel slurry was then used to wash coat a 7 mm ID, 24 inches long YSZ porous tube already coated with two of the three oxygen transport mixed conducting layers, namely intermediate porous layer and dense layer only. The wash coating steps were similar to that described in Examples 1 and 2 above, namely: inspecting and removing any dust, plugging one end, filling with sol-gel slurry, adding slurry as needed to keep the tube completely filled, waiting for about one minute, then draining liquid from the tube. The tube was then air dried at room temperature for about 5 minutes with air flowing at a low flow rate of 40 SCFH. Next the surface exchange layer slurry prepared in a manner described above was used to coat the outside of (over) the dense layer. To complete the formation of the surface exchange layer as well as to burn off organic binders and pore former materials in the catalyst layer and the surface exchange layer the tube was first dried at room temperature for about one hour to about two hours, then heated at a ramp rate of 2° C./min to 1250° C. in an air fired furnace and held there for half an hour, and allowed to cool down. In this instance the catalyst loading was 0.52 g. The SEM microstructure of a cross-section of this catalyst layer suggested catalyst layer thickness to be about 80 μm.

Example 5: Ru-Pervoskite Based Catalyst Layer and Surface Exchange Layer Co-Firing (FIG. 3)

Figure 7:
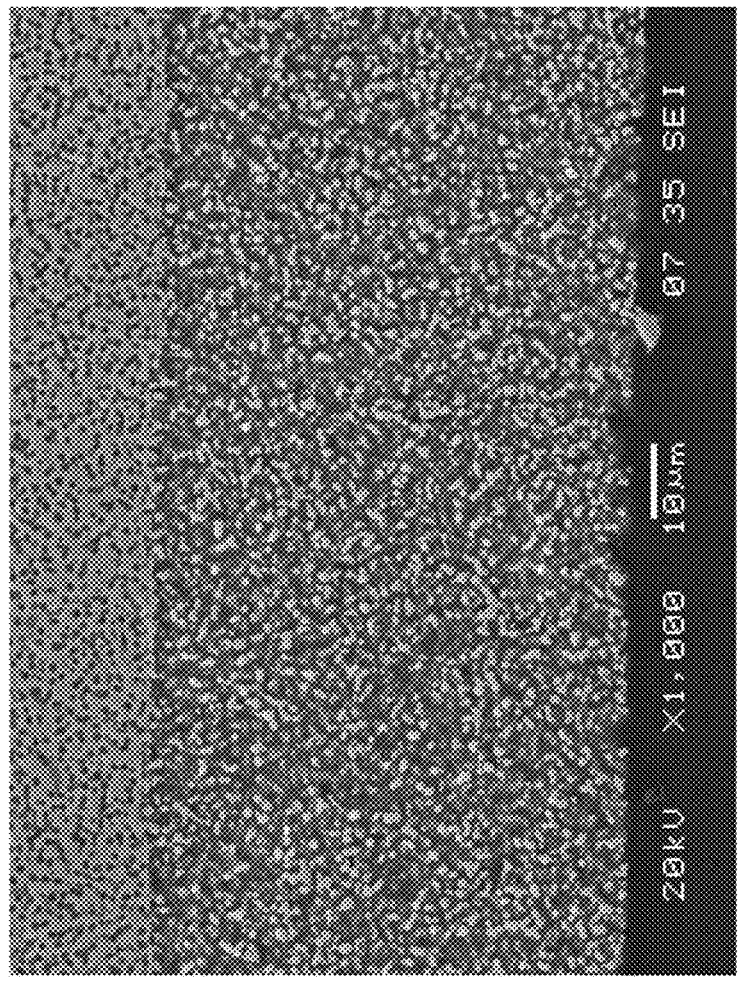

25.5 g of $(La_{0.8}Sr_{0.2})_{0.98}Cr_{0.8}Fe_{0.15}Ru_{0.05}O_{3-\delta}$ (particle size range from 0.2 microns to 0.4 microns) was dispersed in 25 g of toluene solvent (purity>99.5%) along with 5 g of plastic Ferrobinder. Adding 200 g of 1.5 mm YSZ media into the slurry container, the mixture was milled on the roller mill (170 to 175 rpm) for 2 hours. The final particle size of the slurry was about 0.35 microns. Then 4.5 g of pore former such as carbon black (particle size ranged from 0.5 microns to 1.0 micron) was added and mixture further milled for 1 hour. Finally 0.3 g of dispersant (KD-1) dissolved in 15 g of toluene was added to the slurry mixture and milled for additional 1 hour. Similar to Example 4, the tube used in this example (7 mm ID and 24 inches long YSZ porous tube) had only intermediate porous layer and dense layer formed on it. The catalyst layer formation steps of inspecting, plugging one end, filling, adding slurry to keep the tube completely filled during the entire duration of about one minute, and draining liquid were similar. The tube was then air dried at room temperature for about 5 minutes with air flowing at a low flow rate of 40 SCFH. Next the surface exchange layer slurry prepared in a manner described above was used to coat over the dense layer. To complete the formation of the surface exchange layer as well as to burn off organic binders and pore former materials in the catalyst layer and the surface exchange layer, the tube was first dried at room temperature for about one hour to about two hours, then heated at a ramp rate of 2° C./min to 1250° C. in an air fired furnace and held there for half an hour, and allowed to cool down. In this instance the catalyst loading was 0.62 g. The SEM microstructure of a cross-section of this catalyst layer shown in FIG. 7 suggests catalyst layer thickness to be about 55 μm.

Example 6: Thicker Ru-Pervoskite Based Catalyst Layer (FIG. 3)

Figure 8:
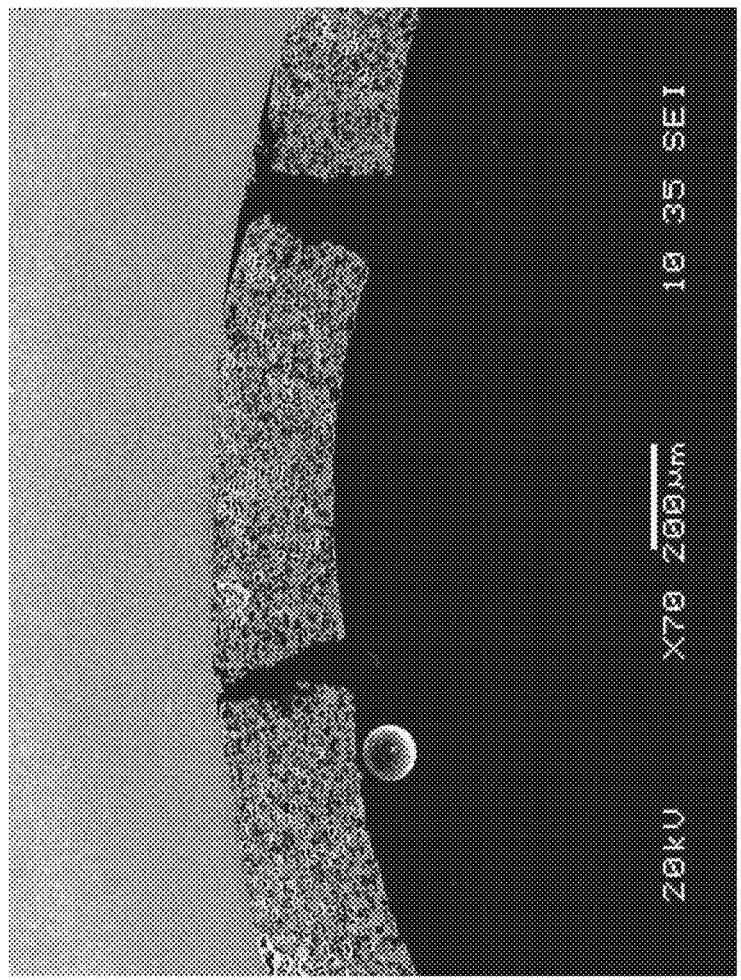

25.5 g of $(La_{0.8}Sr_{0.2})_{0.98}Cr_{0.8}Fe_{0.015}Ru_{0.05}O_{3-\delta}$ (particle size range from 0.2 microns to 0.4 microns) was dispersed in 25 g of toluene solvent (purity>99.5%) along with 5 g of plastic Ferrobinder. Adding 200 g of 1.5 mm YSZ media into the slurry container, the mixture was milled on the roller mill (170 to 175 rpm) for 2 hours. The final particle size of the slurry was about 0.35 microns. Then 4.5 g of pore former such as carbon black (particle size ranged from 0.5 microns to 1.0 micron) was added and mixture further milled for 1 hour. Finally 0.3 g of dispersant (KD-1) dissolved in 15 g of toluene was added to the slurry mixture and milled for additional 1 hour. Similar to Example 5, the tube used in this example (7 mm ID and 24 inches long YSZ porous tube) had only intermediate porous layer and dense layer formed on it. The tube was subjected to catalyst layer formation steps of inspecting, plugging one end, filling, and adding slurry to keep the tube completely filled during the entire duration of about one minute. The liquid was then drained and the tube was air dried for five minutes and then filled again with sol-gel slurry. The tube was kept completely filled by adding slurry as needed. After waiting for about a minute, the liquid was drained. In a manner similar to that described above for Example 5, the tube was then air dried at room temperature for about 5 minutes with air flowing at a low flow rate of 40 SCFH. Next the surface exchange layer slurry prepared in a manner described above was used to coat the outside of the dense layer. To complete the formation of the surface exchange layer as well as to burn off organic binders and pore former materials in the catalyst layer and the surface exchange layer, the tube was first dried at room temperature for about one hour to about two hours, then heated at a ramp rate of 2° C./min to 1250° C. in an air fired furnace and held there for half an hour, and allowed to cool down. In this instance the catalyst loading was 0.84 g. The SEM microstructure of a cross-section of the catalyst layer shown in FIG. 8 indicates cracking and delamination of catalyst layer, and suggests catalyst layer thickness to be about 225 µm where it remained intact. Therefore, it is preferable to control the catalyst thickness within the range of 40 to 150 µm.

Dual Function Composite Oxygen Transport Membrane Performance

The dual function composite oxygen transport membrane tubes made in the examples described above with functional layered structures on the outside surface and the inside surface were tested separately using a standard bench-scale reactor setup. The tube was vertically positioned inside a metal shell embedded in an electrically heated chamber. The dual function composite oxygen transport membrane tube was connected to a source of feed gas and an effluent processing system for safely disposing off syngas product. The tube was heated to an operational temperature of about 950° C. The feed gas was prepared using $CH_4$, CO, $H_2$, and $CO_2$ from gas cylinders and steam from a steam source. The results described below were obtained using a feed gas containing 12 mole % $CH_4$, 11 mole % CO, 52 mole % $H_2$, 4 mole % $CO_2$ and 21 mole % $H_2O$. The feed gas was preheated to about 350° C. prior to feeding to the tube. The flow rate of the feed gas was controlled at achieve a desired space velocity of about 31,000 per hour. Heated air at about 200° C. with a flow rate of 30 SLPM was introduced into the metal shell to flow on the outside of the dual function composite oxygen transport membrane tube in a direction countercurrent to that of feed gas flowing through the tube. The pressure inside the metal shell, that is on the outside of the dual function membrane tube was maintained around 5 psig, and the pressure inside the dual function membrane tube was maintained at a desired value in the range of about 5 psig to about 200 psig. The effluent containing reaction products and unreacted feed species was cooled, water condensed out. The resulting gas stream was sampled and analyzed using a gas chromatograph (GC). The hot air stream leaving the chamber was also cooled and then analyzed for oxygen content using a real-time resolved oxygen analyzer. Table 3 summarizes the results after 100 hours of operation indicating the dual function membranes to have considerably improved methane conversion relative to a membrane that has only oxygen transport functionality. The oxygen transport functionality as indicated by the oxygen flux after 100 hours of stable operation of dual function composite oxygen transport membrane tubes prepared in Examples 1, 3 thru 5 is similar to that of a reference tube that had mixed conducting oxygen transport layers on the outside surface without a catalyst layer on the inside surface. The wash-coating procedure, standardized wash-coating procedure used for forming catalyst layer in these examples involved filling the tube with a slurry containing catalyst layer ingredients, holding the slurry in the completely filled tube for one minute, then draining the slurry followed by air drying and organics burn-off in air. The tubular dual function composite oxygen transport membrane made in Example 2 has similar oxygen flux performance even though a slightly different procedure was followed; the slurry in the completely filled tube was held for considerably less time than one minute, resulting in a thin catalyst layer. In Example 6, however the tube was again refilled with the slurry, the catalyst layer formed was thicker, and the oxygen flux is considerably lower than those of tubes prepared following standardized wash-coating procedure. The thicker catalyst layer could pose higher diffusional resistance to transport of fuel species through the catalyst layer into the porous substrate towards the intermediate porous layer for reaction with permeated oxygen within the membrane, affecting the driving potential for oxygen transport. The results in Table 3 also indicate that the composite oxygen transport membranes with catalyst layer, that is dual function composite oxygen transport membranes achieved considerably higher methane conversion. The catalyst layer thickness appears to be an important factor. The Example 2 membrane that had a thinner catalyst layer, about 15 microns appears to achieve relatively lower methane conversion compared to those having catalyst layer thicknesses in the range of about 50 microns to about 80 microns. The Example 6 membrane that had a thicker catalyst layer of about 225 microns with cracks and delamination in some cross sections, also had relatively lower methane conversion.

TABLE 3

| Example | Catalyst type | Fabrication Method | Catalyst layer thickness, microns | Normalized $O_2$ Flux* | $CH_4$ conversion, % |
| --- | --- | --- | --- | --- | --- |
| Reference | N/A | FIG. 2 without catalyst layer steps | N/A | 1.00 | 4.3% |
| 1 | Ni—Rh | FIG. 2 | 75 | 0.98 | 98.6% |
| 2 | Ni—Rh | FIG. 2 | 15 | 1.00 | 95.4% |
| 3 | Ru-Pervoskite | FIG. 2 | 62 | 0.99 | 98.8% |
| 4 | Ni—Rh | FIG. 3 | 80 | 0.99 | 98.2% |
| 5 | Ru-Pervoskite | FIG. 3 | 55 | 1.01 | 98.9% |
| 6 | Ru-Pervoskite | FIG. 3 | 225 | 0.83 | 93.8% |

*Normalized with respect to reference membrane (without catalyst layer)

Although the present invention has been described with reference to preferred embodiments, as will occur to those skilled in the art, changes and additions to such embodiment can be made without departing from the spirit and scope of the present invention as set forth in the appended claims. The dual function composite oxygen transport membrane, even though described in the context of syngas production are not limited to such uses.

We claim:

1. A dual function composite oxygen transport membrane, said dual function membrane comprising: a porous substrate having a first side and an opposing side, a plurality of mixed conducting oxygen transport layers, and a catalyst layer for catalyzing endothermic reactions, wherein the plurality of mixed conducting oxygen transport layers are formed on the first side of the porous substrate and the catalyst layer is coated on the opposing second side of the porous substrate, wherein a thickness of the catalyst layer is at least 10 microns.

2. The dual function composite oxygen transport membrane of claim 1 wherein said plurality of mixed conducting oxygen transport layers form a layered structure comprising a dense layer, an intermediate porous layer located between the dense layer and the porous substrate, and an optional surface exchange layer over the dense layer wherein each of the dense layer and the intermediate porous layer and the surface exchange layer are capable of conducting oxygen ions and electrons at operational temperatures.

3. The dual function composite oxygen transport membrane of claim 2 wherein said layered structure formed on the first side of the porous substrate separates oxygen from an oxygen containing gas stream in contact with the layered structure when operational at operational temperatures and provide said separated oxygen for reaction with a combustible substance diffusing through the catalyst layer formed on the opposing second side of said porous substrate.

4. The dual function composite oxygen transport membrane of claim 1 wherein, the thickness of said catalyst layer is in the range of about 40 microns to about 80 microns.

5. The dual function composite oxygen transport membrane of claim 1 wherein the catalyst layer contains one or more of nickel, rhodium, platinum, ruthenium, or palladium.

6. The dual function composite oxygen transport membrane of claim 1 wherein the catalyst layer is formed using precursors of nickel or rhodium or platinum or ruthenium or palladium or mixtures of two or more thereof.

7. The dual function composite oxygen transport membrane of claim 1 wherein the catalyst layer is formed using a perovskite material containing Ruthenium.

8. The dual function composite oxygen transport membrane of claim 1 further comprising the porous substrate configured as a substantially tubular structure wherein the plurality of mixed conducting oxygen transport layers are formed on the outside surface of said tubular structure and the catalyst layer is formed on the inside surface of said tubular structure.

9. A method of forming a dual function composite oxygen transport membrane, said method comprising: providing a porous substrate having a first side and an opposing second side; forming a layer structure of mixed conducting materials in a sintered state on the first side of the porous substrate, coating a catalyst layer on the opposing second side of the porous substrate for catalyzing endothermic reactions, wherein a thickness of the catalyst layer is at least 10 microns.

10. The method of claim 9 wherein the layered structure of mixed conducting materials comprises an intermediate porous layer, a dense layer, and an optional surface exchange layer, and the forming of the dense layer and the forming of the catalyst layer is carried out in separate steps.

11. A method of forming a dual function composite oxygen transport membrane, said method comprising: providing a porous substrate having a first side and an opposing second side; forming an intermediate porous layer on the first side of the porous substrate; forming a dense layer over the intermediate porous layer, forming a surface exchange layer over the dense layer, and coating a catalyst layer on the opposing second side of the porous substrate, wherein a thickness of the catalyst layer is at least 10 microns.

12. The method of claim 11 wherein the coating of the catalyst layer is carried out after the forming of the surface exchange layer.

13. The method of claim 11 wherein a catalyst layer coating step in the coating of the catalyst layer is carried out prior to a high temperature sintering step in the forming of the surface exchange layer.

14. The method of claim 11 wherein a catalyst layer coating step in the coating of the catalyst layer is carried out prior to a coating step in the forming of the surface exchange layer.

15. The method of claim 11 wherein a catalyst layer coating step in the coating of the catalyst layer is a wash-coating technique.

* * * * *